United States Patent
Punnoose et al.

(10) Patent No.: US 11,790,471 B2
(45) Date of Patent: Oct. 17, 2023

(54) SYSTEM AND METHOD OF PROVIDING IDENTITY VERIFICATION SERVICES

(71) Applicant: United States Postal Service, Washington, DC (US)

(72) Inventors: Josen Punnoose, Crofton, MD (US); Sachin Agarwal, Washington, DC (US)

(73) Assignee: United States Postal Service, Washington, DC (US)

( * ) Notice: Subject to any disclaimer, the term of this patent is extended or adjusted under 35 U.S.C. 154(b) by 322 days.

(21) Appl. No.: 17/011,859

(22) Filed: Sep. 3, 2020

(65) Prior Publication Data
US 2021/0073933 A1 Mar. 11, 2021

Related U.S. Application Data

(60) Provisional application No. 62/897,061, filed on Sep. 6, 2019.

(51) Int. Cl.
*G06Q 50/26* (2012.01)
*H04W 4/029* (2018.01)
(Continued)

(52) U.S. Cl.
CPC ........... *G06Q 50/265* (2013.01); *G06F 21/31* (2013.01); *G06V 30/413* (2022.01); *H04W 4/029* (2018.02)

(58) Field of Classification Search
CPC ................ G06Q 50/265; G06F 21/31; G06F 2221/2111; G06F 21/33; G06V 30/413;
(Continued)

(56) References Cited

U.S. PATENT DOCUMENTS 7,483,862 B1   1/2009 Robinson et al.
7,606,918 B2  10/2009 Holzman et al.
(Continued)

FOREIGN PATENT DOCUMENTS

CN    1139894 C    2/2004
CN  101697514 A    4/2010
(Continued)

OTHER PUBLICATIONS

International Search Report and Written Opinion dated Aug. 19, 2014 for International Patent Application No. PCT/US14/25851 which shares priority of U.S. Appl. No. 61/792,749, with captioned U.S. Appl. No. 14/208,421.
(Continued)

*Primary Examiner* — James J Yang
(74) *Attorney, Agent, or Firm* — Knobbe, Martens, Olson & Bear, LLP

(57) ABSTRACT

Generating authentication credentials includes receiving from a first user input identifying a customer identifier for an online account with a business or organization and a residential or business physical address, and sending via a network a notification to a first user system to follow instructions on a mail piece to be received by the first user. The mail piece is physically sent via a distribution network to the physical address and an online application is activated in response to scanning a coded indicia on the mail piece. Data indicative of an identity of the first user is received and the identity of the first user is verified based on at least information associated with the coded indicia and the received data. A recommendation is generated whether to approve the online account and an electronic credential is created for the first user based on acceptance of the online account.

21 Claims, 38 Drawing Sheets

(51) Int. Cl.
*G06F 21/31* (2013.01)
*G06V 30/413* (2022.01)

(58) Field of Classification Search
CPC ..... H04W 4/029; H04W 12/06; H04W 12/64; H04L 63/083
See application file for complete search history.

(56) References Cited

U.S. PATENT DOCUMENTS

| | | | |
|---|---|---|---|
| 8,144,055 | B2 | 3/2012 | Tysowski et al. |
| 8,150,616 | B2 | 4/2012 | Shimizu |
| 8,341,712 | B2 | 12/2012 | Machani |
| 9,015,207 | B2 | 4/2015 | Foit |
| 9,047,617 | B2 | 6/2015 | Sanchez et al. |
| 9,280,684 | B1 | 3/2016 | Kragh et al. |
| 2002/0029248 | A1 | 3/2002 | Cook et al. |
| 2003/0004743 | A1 | 1/2003 | Callegari |
| 2003/0022676 | A1 | 1/2003 | Nakamoto et al. |
| 2004/0211838 | A1 | 10/2004 | O'Callaghan et al. |
| 2009/0254440 | A1 | 10/2009 | Pharris |
| 2009/0257569 | A1 | 10/2009 | Bristow et al. |
| 2010/0024017 | A1 | 1/2010 | Ashfield et al. |
| 2011/0053559 | A1 | 3/2011 | Klein |
| 2011/0066550 | A1 | 3/2011 | Shank et al. |
| 2012/0089618 | A1 | 4/2012 | Anschutz et al. |
| 2012/0281077 | A1 | 11/2012 | Cañero Morales et al. |
| 2012/0291107 | A1 | 11/2012 | Piliouras |
| 2012/0293642 | A1 | 11/2012 | Berini et al. |
| 2013/0022231 | A1 | 1/2013 | Nepomniachtchi et al. |
| 2013/0027227 | A1 | 1/2013 | Nordstrom |
| 2013/0028502 | A1 | 1/2013 | Nepomniachtchi et al. |
| 2013/0117862 | A1 | 5/2013 | Farrell et al. |
| 2014/0074733 | A1 | 3/2014 | Den Herder et al. |
| 2014/0258136 | A1 | 9/2014 | Ellis |
| 2014/0279450 | A1 | 9/2014 | Gujral |
| 2014/0279519 | A1 | 9/2014 | Mattes et al. |
| 2015/0032625 | A1 | 1/2015 | Dill et al. |
| 2015/0120529 | A1* | 4/2015 | Faaborg ............ G06Q 10/083 705/330 |
| 2015/0120536 | A1 | 4/2015 | Talker |
| 2015/0127535 | A1 | 5/2015 | Chavarria et al. |
| 2015/0199643 | A1* | 7/2015 | Hubner ............ G06Q 10/0833 705/333 |
| 2015/0248439 | A1 | 9/2015 | Ratnakar |
| 2016/0300242 | A1* | 10/2016 | Truong ................ G01S 19/13 |
| 2017/0169422 | A1 | 6/2017 | Ye et al. |

FOREIGN PATENT DOCUMENTS

| | | |
|---|---|---|
| CN | 102045367 A | 5/2011 |
| CN | 102339441 A | 2/2012 |

OTHER PUBLICATIONS

International Search Report and Written Opinion dated Sep. 19, 2016 for International Patent Application No. PCT/US16/39901.

* cited by examiner

| FIG. 4A | FIG. 4B | FIG. 4C |

FIG. 4

| FIG. 5A | FIG. 5B | FIG. 5C |
|---------|---------|---------|
| FIG. 5D | FIG. 5E | FIG. 5F |

FIG. 5

Sign Into Your Account

Already have an account?
Enter Your Username and Password
* Indicates a required field.

*Username

*Password

Forgot your password?

[ Sign In ] — 910

| | | |
|---|---|---|
| New? | | |
| Create a USPS.com Account to... | | |
| • Print shipping labels. | | |
| • Request a Package Pickup. | | |
| • Buy stamps and shop. | | |
| • Manage PO boxes. | | |
| • Print custom forms online. | | |
| • File domestic claims. | | |
| • Set a preferred language. | | |
| [ Sign Up Now ] — 920 | | |

LEGAL
Privacy Policy >
Terms of Use >
FOIA >
No FEAR Act EEO Data >

ON USPS.COM
Government Services >
Buy Stamps & Shop >
Print a Label with Postage >
Customer Service >
Delivering Solutions to the Last Mile >
Site Index >

ON ABOUT USPS.COM
About USPS Home >
Newsroom >
USPS Service Alerts >
Forms & Publications >
Careers >

OTHER USPS SITES
Business Customer Gateway >
Postal Inspectors >
Inspector General >
Postal Explorer >

Secure Account Verification

For added security, some USPS applications require additional authentication. To begin the authentication process...

⎡1000

Verify Your Profile Information

To verify your identity, we need to confirm your name, address, and email address.

To edit your information, click, 'Edit Profile Information.

Name and Address
Test User
13600 EDS Drive
Herndon, VA 20171

Edit Profile Information

Email Address
testuser@test.com

Phone
703-111-1111

Additional Information Needed

Please enter your date of birth and social security number.

*Indicates a required field.

*Date of Birth
[ mm/dd/yyyy ]

*Re-enter Date of Birth
[ mm/dd/yyyy ]

*Social Security Number
[ 9 digits, no dashes ]

*Re-enter Social Security Number
[ 9 digits, no dashes ]

To make sure that no one attempts to see, manage, or tamper with your shipments, we must confirm that you are actually you. This is not a credit check. Answers to these questions are for verification only and neither the USPS nor its partners store your answers.

How Your Information is Used...

1. A USPS Service partner will independently verify your information to uniquely resolve your identity.
2. The independent service provider will generate questions that only you should be able to answer.
3. Answers to your questions are not retained by USPS.

[ Cancel ]  [ Get Verified ]──1010

Verification Questions

A financial service provider generated these questions. USPS does not keep either the information used to create the questions or your answers.

*You must answer every question to verify your identity and address.

*Your credit file indicates you may have a mortgage loan, opened in or around January 2012. Who is the current provider for this account?
- ○ ABC Mortgage
- ○ Citibank
- ○ Suntrust
- ○ Capital One
- ○ None of the Above

*What is your total scheduled monthly payment for the above referenced mortgage?
- ○ $500 - $1,000
- ○ $1,001 - $1,500
- ○ $1,501 - $2,000
- ○ $2,001 - $2,500
- ○ None of the Above

*On which of the following streets have you lived?
- ○ Elm Street
- ○ Oak Grove
- ○ Washington Boulevard
- ○ Whispering Woods
- ○ None of the Above

*Of which of these banking institutions do you have an account?
- ○ Bank of America
- ○ PNC Bank
- ○ USAA Bank
- ○ Wells Fargo
- ○ None of the Above

[ Cancel ]   [ Submit Answers ] —1110

1100

Preferences Summary

*1200*

Communications Preferences

| Communications | Current Info | Select an entry to make a change |
|---|---|---|
| ⊙ Language Preference | English | Change Default Language > |
| ⊙ Communication Preference | From USPS<br>From USPS Partners | Change Communication Preferences > |

Edit All Preferences >

Security Preference Information

| Security | Current Info | Select an entry to make a change |
|---|---|---|
| ⊙ Password | ******** | Change Password > |
| ⊙ Authentication Level | Basic | Upgrade >  ←1210 |

FIG. 12

[ Request New In Person Proofing Email ] — 1610
[ Retry Online Identity Verification ] — 1620

Nearest USPS Identity Proofing Facilities — 1630

These are the closest USPS® identity proofing service facilities to your profile address. To be certain of service, call ahead.

| Distance | Location | Hours |
|---|---|---|
| 1.2 miles | OAK HILL > 13520 MCLEAREN RD HERNDON, VA 20171-9898 800-ASK-USPS® (800-275-8777) | Mon-Fri 9:00am - 5:00pm Sat 9:00am - 2:00pm Sun Closed Lot Parking Available |
| 2.4 miles | HERNDON > 590 GROVE ST HERNDON, VA 20170-9898 800-ASK-USPS® (800-275-8777) | Mon-Fri 9:00am - 6:00pm Sat 9:00am - 2:00pm Sun Closed Lot Parking Available |
| 3.9 miles | RESTON > 11110 SUNSET HILLS RD RESTON, VA 20190-9898 800-ASK-USPS® (800-275-8777) | Mon-Fri 8:30am - 5:00pm Sat 8:30am - 2:00pm Sun Closed Lot Parking Available |
| 4.0 miles | CHANTILLY > 4410 BROOKFIELD CORPORATE DR CHANTILLY, VA 20151-9898 800-ASK-USPS® (800-275-8777) | Mon-Fri 9:00am - 6:00pm Sat 9:00am - 2:00pm Sun Closed Lot Parking Available |

Search for more USPS facilities >

*FIG. 16B*

Acceptable Secondary Forms of Identification
- Current lease, mortgage, or deed of trust  ⎫
- Voter or vehicle registration card          ⎬ 1730
- Home or vehicle insurance policy            ⎭

Please do not reply to this message. Replies are sent to an unmonitored mailbox.

Thank you,
United States Postal Service

USPS employees will never ask for your username and password. Do not willingly reveal your credentials to anyone that asks.

Nearest USPS Identity Proofing Facilities

These are the closest USPS® identity proofing service facilities to your profile address. To be certain of service, call ahead.

In-Person Proofing is a new service and not currently available in every location. We are working to increase the number of participating locations. If the locations listed are not close to your location, we recommend that you retry online identity verification.

| Location | Hours |
|---|---|
| L'ENFANT PLAZA > 470 L'ENFANT PLZ SW STE 604 WASHINGTON, DC 20024-9995 800-ASK-USPS® (800-275-8777) | Mon-Fri 8:00am - 5:00pm Sat - Sun Closed Street Parking Available |
| BETHESDA > 6900 WISCONSIN AVE STE 100 CHEVY CHASE, MD 20815-9996 800-ASK-USPS® (800-275-8777) | Mon-Fri 9:00am - 5:00pm Sat 9:00am - 4:00pm Sun Closed Street Parking Available |

FIG. 17B

SYSTEM AND METHOD OF PROVIDING IDENTITY VERIFICATION SERVICES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of U.S. Provisional Application No. 62/897,061 filed on Sep. 6, 2019.

BACKGROUND

The application is directed to creating a verified digital identity and more particularly to creating a verified digital identity by using direct mail to verify the identity if the individual receiving the mail piece.

It has been estimated that 75% of business customers in the United States would avoid creating a new account due to password fatigue. The use of certain government services, for example, requires a certain high level of digital authentication to exist. For example, the "My USPS" application requires a verified identity to set up notifications and to start receiving tracking updates for shipped products. In addition, each federal government agency has its own website to use government services and requires a separate digital credential through their own log-in process. Thus there are passwords and digital identification that are needed for each service.

There are market opportunities in ecommerce to allow consumers to securely use emerging marketplace and online retail services while safeguarding payment and shipping information. There are other opportunities in access control to decrease the distribution of sensitive information by centralizing identity information to only share necessary data with appropriate parties. There are market needs for digital and physical identity verification and secure sign-on across government services to increase a move to digital services.

SUMMARY

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include online registration, identity proofing, credentialing, authentication and identity attribute validation.

Identity verification services can include a third party service integrated with an online application, such as a U.S. Postal Service application, for example, that uses knowledge-based questions to verify a person's identity online. Identity verification services can also include technology solutions that enable in-person verification of an individual's identity at a location of a service business, such as at a U.S. Postal Service retail unit, or by an employee of the business, such as a letter carrier, at a customer's residence or a business location of the customer for the purpose of issuing a digital identity or offered as a service for a third party. Identity verification services further include issuance and management of credentials, such as usernames/passwords, tokens or other authentication mechanisms, with increasing levels of trust to appropriately correspond with the online service or application being accessed. These services allow users to perform online registration, identity proofing, credentialing, authentication and identity attribute validation.

In one aspect described herein, a method of generating authentication credentials, the method comprises receiving from a first user, using a first user computing system and a network, input identifying a customer identifier for an online account with a business or organization and a residential or business physical address; receiving a coded indicia, the coded indicia encoding identity verification instructions for verifying the identity of the customer; sending a physical distribution item via a distribution network to the residential or business physical address of the first user, the physical mailpiece having the coded indicia thereon; activating an identity verification application in response to scanning a coded indicia on the mail piece; electronically receiving a plurality of data indicative of an identity of the first user based on instructions provided in the identity verification application; verifying the identity of the first user based on the received plurality of data; generating a recommendation whether to approve the online account for the business or organization; electronically sending, via the network, an acceptance or a denial of opening the online account; and creating an electronic credential or token for the first user based on the acceptance of the online account.

In some embodiments, the data is based in part on a scan of a government-issued identification card or document and a picture or video of the face of the first user.

In some embodiments, scanning the coded indicia on the distribution item is performed by a mobile computer system, having a real-time geographic location circuit, operated by a mobile second user.

In some embodiments, the mobile second user is a person traversing a preassigned route and is employed by or an agent of an entity.

In some embodiments, the preassigned route includes the residential or business physical address corresponding to the first user.

In some embodiments, the coded indicia encodes instructions to the identity verification application regarding the plurality of data indicative of the identity of the first user.

In some embodiments, the verifying includes electronically determining a location of the first user computing system and utilizing the determined location to confirm that it matches the first user's residential or business physical address.

In another aspect described herein, a method of generating authentication credentials, the method comprises receiving from a first user, using a first user computing system and a network, input identifying a customer identifier for an online account with a business or organization, a residential or business physical address, and a selection indicating a first location of a validation event; receiving a coded indicia, the coded indicia encoding identity verification instructions for verifying the identity of the customer; sending a physical distribution item via a distribution network to the residential or business physical address of the first user, the distribution item having the coded indicia thereon; receiving real-time geographic coordinates of a location for a specialized mobile computing system corresponding to a mobile second user, the mobile second user being a person employed by or an agent of an entity, while the mobile second user is traversing a preassigned route; determining whether the mobile second user is at a location on the second user's preassigned route based on geographic location information of the mobile second user; providing a notification to the mobile second user when the mobile computing system is within a predetermined distance from the first location of the validation event based on the received real-time geographic coordinates; activating an identity verification application in response to scanning a coded indicia on the first user's distribution item at the validation event; electronically receiving a plurality of data indicative of an identity of the first user based on instructions provided in the identity verification application; verifying the identity of the first user based on the received plurality of data indicative of an identity of the first user, and the geographic location information of the mobile second user at the validation event; generating a recommendation whether to approve the online account for the business or organization; electronically sending, via the network, an acceptance or a denial of opening the online account; and creating an electronic credential or token for the first user based on the acceptance of the online account.

In some embodiments, the data is based in part on a scan of a government-issued identification card or document and a picture or video of the face of the first user by the mobile computing system.

In some embodiments, the specialized mobile computing system corresponding to the mobile second user includes a real-time geographic location circuit.

In some embodiments, the preassigned route includes the residential or business physical address corresponding to the first user.

In some embodiments, the coded indicia encodes instructions to the identity verification application regarding the plurality of data indicative of the identity of the first user.

In another aspect, a system for generating authentication credentials, the system comprises a networked computing device including one or more processors operably configured to access one or more storages, wherein the one or more processors is operably configured to: receive from a first user, using a first user computing system, input identifying a customer identifier for an online account with a business or organization, and a residential or business physical address; receive a coded indicia, encoding identity verification instructions for verifying the identity of the customer; notify the business or organization that a physical distribution item having the coded indicia thereon is delivered to the residential or business physical address of the first user via a distribution network; activate an identity verification application in response to scanning the coded indicia on the distribution item; electronically receive a plurality of data indicative of an identity of the first user based on instructions provided on the distribution item or in the online application; verify the identity of the first user based on at least information associated with the coded indicia, and the received plurality of data indicative of an identity of the first user; generate a recommendation whether to approve the online account for the business or organization; electronically send an acceptance or a denial of opening the online account; and create an electronic credential or token for the first user based on the acceptance of the online account.

In some embodiments, the data is based in part on a scan of a government-issued identification card or document and a picture or video of the face of the first user.

In some embodiments, the system additionally comprises a mobile computer system having a real-time geographic location circuit operated by a mobile second user, wherein scanning the coded indicia on the distribution item is performed by the mobile computer system.

In some embodiments, the mobile second user is a person traversing a preassigned route and is employed by or an agent of an entity.

In some embodiments, the preassigned route includes the residential or business physical address corresponding to the first user.

In some embodiments, the coded indicia encodes instructions to the identity verification application regarding the plurality of data indicative of the identity of the first user.

In some embodiments, wherein the verifying includes electronically determining a location of the first user computing system and utilizing the determined location to confirm that it matches the first user's residential or business physical address.

In another aspect described herein, a system of generating authentication credentials comprises a networked computing device including one or more processors operably configured to access one or more storages, wherein the one or more processors is operably configured to: receive from a first user, using a first user computing system, input identifying a customer identifier for an online account with a business or organization, a residential or business physical address, and a selection indicating a first location of a validation event; receive a coded indicia, encoding identity verification instructions for verifying the identity of the customer; notify the business or organization that a physical distribution item having the coded indicia thereon is delivered to the residential or business physical address of the first user via a distribution network; a specialized mobile computing system corresponding to a mobile second user, the mobile second user being a person employed by or an agent of an entity, wherein the mobile specialized computing device includes a global positioning system circuit, a display and one or more processors operably configured to: receive real-time geographic coordinates of a location for the specialized mobile computing system while the mobile second user is traversing a preassigned route; determine whether the mobile second user is at a location on the second user's preassigned route based on geographic location information of the mobile second user; provide a notification to the mobile second user when the mobile computing system is within a predetermined distance from the first location of the validation event based on the received real-time geographic coordinates; scan the coded indicia on the distribution item at the validation event to activate an identity verification application on the distribution network; electronically receive a plurality of data indicative of an identity of the first user; verify the identity of the first user based on the received plurality of data indicative of an identity of the first user, and the geographic location information of the mobile second user at the validation event; generate a recommendation whether to approve the online account for the business or organization; electronically send an acceptance or a denial of opening the online account; and create an electronic credential or token for the first user based on the acceptance of the online account.

In some embodiments, the data is based in part on a scan of a government-issued identification card or document and a picture or video of the face of the first user by the mobile computing system.

In some embodiments, the preassigned route includes the residential or business physical address corresponding to the first user.

In some embodiments, electronically receiving a plurality of data indicative of an identity of the first user is based on instructions provided on the distribution item or in the online application.

BRIEF DESCRIPTION OF THE DRAWINGS

FIG. 4, comprising

FIG. 5, comprising

FIG. 9 is an example screen display when a customer is ready to sign into their account or desires to create a business, e.g., USPS, account.

FIG. 10 is an example screen display when a customer verifies their account.

FIG. 11 is an example screen display of exemplary verification questions generated by a knowledge base supplier such as a financial service provider.

FIG. 12 is an example screen display illustrating a customer's preferences summary including an authentication level and a way to upgrade that level.

FIGS. 16A-16B, is an example screen display illustrating a screen showing when in-person proofing has been selected to verify the customer's identity.

FIGS. 17A-17B, is an example screen display of an email having a barcode sent to the customer when in-person proofing has been selected.

DETAILED DESCRIPTION

Figure 1:
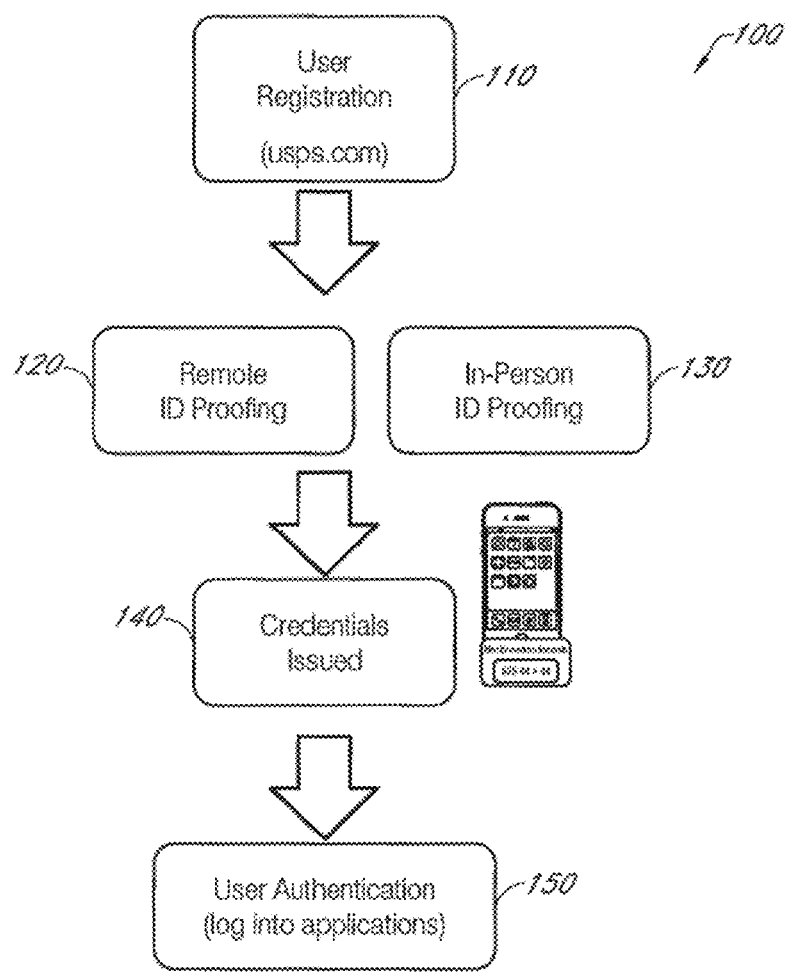
FIG. 1 is a flow diagram of an embodiment of an example high level process to verify customer identity.

The following detailed description is directed to certain specific embodiments of the invention. However, the invention can be embodied in a multitude of different ways as defined and covered by the claims. In this description, reference is made to the drawings wherein like parts are designated with like numerals throughout.

At a high level, internal digital identity services accomplish their function in several steps. First, a consumer can access an online application to initiate a verified digital identity. The consumer's identity can be verified online, or by visiting a service business location or at their residence by an employee of the business. If certain criteria are met, a verified digital identity is issued with a higher level of assurance. Consumers can use their verified credential for login to various services, including government services and commercial sites. This improves the privacy and security for users.

For the purposes of this discussion, the U.S. Postal Service (USPS) will be referred to as the service business as an example only. Other entities could perform this role. Thus, a consumer can access an online application such as a USPS application to initiate a process to obtain a verified digital identity. The consumer's identity can be verified online, or by visiting a post office or at their residence by their letter carrier. If certain criteria are met, a USPS verified digital identity is issued with a higher level of assurance. Consumers can use their verified USPS application credential for login to USPS services, government services and commercial sites.

The National Institute of Standards and Technology (NIST) special publications (SP) 800-63 Electronic Authentication Guideline establishes technical guidelines for implementing authentication mechanisms for government and electronic commerce. While these recommendations are specifically for the United States, they are broadly applicable to any environment that requires the authentication of entities and users. These recommendations define the technical requirements for the four levels of assurance (LoA) in the areas of identity, proofing, registration, tokens, authentication protocols and related assertions. The NIST regulation complements the Office of Management and Budget (OMB) Guidelines "E-Authentication Guidance for Federal Agencies", which also define four LoA for electronic communications. These four levels of authentication, Levels 1 to 4, are defined in terms of the consequences of the authentication errors and misuse of credentials. Level 1 is the lowest assurance and Level 4 is the highest. The OMB guidance defines the required level of authentication assurance in terms of the likely consequences of an authentication error. As the consequences of an authentication error become more serious, the required level of assurance increases. The international standard ISO/IEC 29115 (Entity Authentication Assurance Framework) provides a framework for managing user authentication guarantees. It establishes four LoA for entities, stipulating the criteria and guidelines for each of the defined levels.

The four levels of assurance are briefly described as follows. Although there is no identity proofing requirement at Level 1, the authentication mechanism provides some assurance that the same user who participated in previous transactions is accessing the protected transaction or data. Level 2 provides single factor authentication. At Level 2, identity proofing requirements are introduced, requiring presentation of identifying materials or information. Level 3 provides multi-factor authentication. At least two authentication factors are required. At this level, identity proofing procedures require verification of identifying materials and information. Level 4 is intended to provide the highest practical authentication assurance. Level 4 authentication is based on proof of possession of a key through a cryptographic protocol. At this level, in-person identity proofing is required.

The USPS can also provide in-person identity verification and biometric capture services to other government agencies or companies as a component service. At a high level, external digital identity services include several steps. First, a consumer can register with an agency or commercial company. The agency or company needs in-person identity verification and/or biometric capture and therefore sends the user to the USPS. The user visits a nearby Post Office or schedules an appointment with a letter carrier. The user's identification is verified against information provided by the requesting party, and at select sites biometrics are captured. The information obtained is securely transferred to the requesting party so as to complete the transaction. Thus the USPS can be a national enabler of verified digital identities and a convenient biometric capture partner.

FIG. 1 is a diagram of an example high level process 100 to verify customer identity. An enhanced identity process, such as the exemplary USPS process, which can be performed via a website such as a USPS website, verifies the customer identity to a higher level of assurance (e.g., binding a digital identity to a physical address, phone and email). Beginning at a step 110, a user registration is performed at a website USPS, for example. Proceeding to step 120 or step 130, two ways of performing identity proofing will be described. At step 120, remote identity (ID) proofing is performed. Remote identity proofing is primarily conducted remotely via knowledge based out of wallet questions. Remote identity proofing will be further described herein below. Alternatively at step 130, in-person ID proofing is performed. In-person proofing can be performed at local business locations such as via USPS personnel at a local Post Office with a retail clerk or via a mail carrier on their route by validating that a photo ID of a customer matches what the user entered during registration. In-person proofing will be further described herein below. Proceeding to step 140, a credentialing process is performed. After a successful identity proofing, a credential in the form of a user name and password combination is created and assigned. Credentialing may also involve tying the credential to a mobile device and may include biometric login such as a fingerprint or voiceprint. After completion of the credentialing, process 100 proceeds to an authentication step 150. Once the user has an activated credential, the user can log into an application using the credential to identify themselves.

Figure 2:
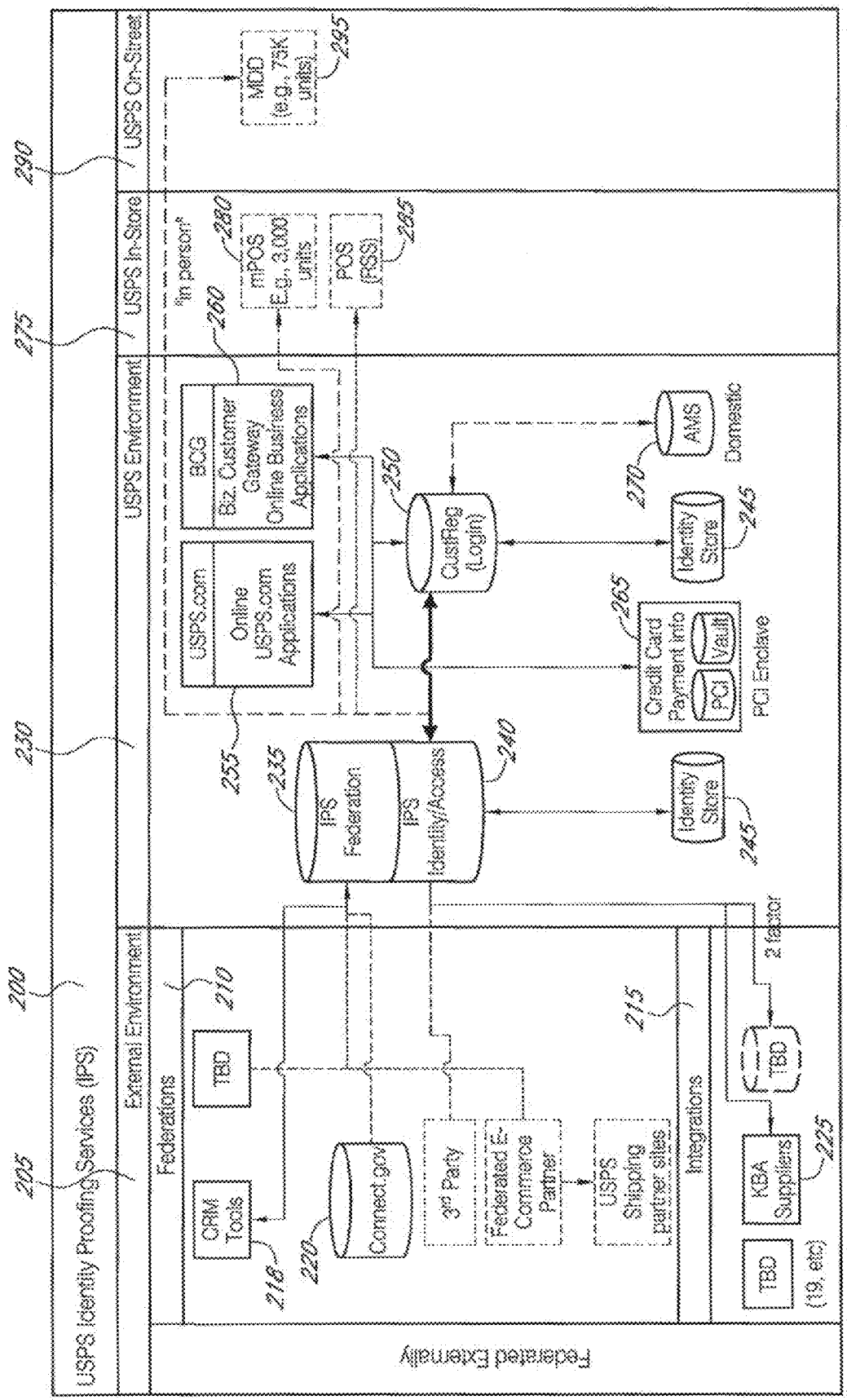
FIG. 2 is a block diagram of an example relational configuration of elements of a system to conduct the process illustrated in FIG. 1.

FIG. 2 is a block diagram of an example relational configuration 200 of portions of a system to conduct the process 100 illustrated in FIG. 1. The configuration 200 includes an external environment 205, a service environment 230, such as available through the USPS, an in-store environment 275, such as available through the USPS, and an on-street environment 290, such as available through the USPS. The external environment 205 includes a federations section 210 and an integrations section 215. The federations section 210 includes customer relations management (CRM) tools 218 and a service platform 220 such as connect.gov entity. In certain embodiments, connect.gov is a service platform that enables individuals to utilize a user name and password to digitally access online across multiple government agency websites. The integration portion 215 includes Knowledge Based Authentication (KBA) suppliers 225. A KBA supplier can be used to score a customer's answers to a set of questions, for example such as shown in FIG. 11. The knowledge based authentication suppliers are connected to an Identity and Proofing Service (IPS) identity/access portion 240 such as used in the USPS environment. In certain embodiments, the IPS identity/access portion 240 software package that can be modified with custom programming or scripts. The IPS identity/access portion 240 provides identity and access control management functions, which can include full life cycle functions around registration, credentialing, authentication, provisioning, reporting and directory services.

The IPS identity/access portion 240 works in combination with an IPS federation portion 235. The IPS federation portion 235 provides cross domain login through credential tokenization according to industry protocols, such as Security Assertion Markup Language (SAML) or OpenID Connect. Identity federation describes use-cases, standards and technologies for enabling the propagation of identity information across different security domains. For promoting federation among enterprises, SAML is an XML-based standard developed by the Organization for the Advancement of Structured Information Standards (OASIS) Security Services Technical Committee for exchanging authentication and authorization data between security realms, so it can be used to support identity federation. The IPS federation portion 235 can be connected with the service platform 220 such as the connect.gov application.

The IPS identity/access portion 240 is also connected to an identity storage 245 and a customer registration (CustReg) login portion 250. The CustReg portion 250 is further connected to an online application 255, such as the USPS application, which can include multiple online applications and to a business customer gateway portion 260 of customer gateway online business applications. The applications 255 and 260 are connected with a payment card industry (PCI) enclave 265 that has credit card payment information including PCI information and a vault. The customer registration portion 250 further connects to an address management system (AMS) 270, which in certain embodiments is the United States Postal Service master database of deliverable addresses.

In certain embodiments, the IPS identity/access portion 240 connects to one of a point of sale (POS) next generation retail system 285 or to a mobile point of sale (mPOS) system 280. The mPOS system 280 and POS retail system 285 can be utilized by business employees in person in the in-person portion 275. In certain embodiments, the mPOS system 280 includes a handheld computing device, for example, a tablet computer, smart phone, or other mobile computing device, a portable receipt printer and a postage printer. See FIG. 7 for an illustration of one embodiment of the mPOS system 280. The mPOS system 280 can include a scanning feature and further includes a processor, memory, a display, and a custom program that makes the device a specialized machine. In another embodiment, the IPS identity/access portion 240 connects with a mobile delivery device (MDD) system 295 in an on-street portion 290. The MDD 295 can include various features including a scanning subsystem, a display portion, a battery charging portion, a processor, a memory, various key inputs, such as a keyboard and a keypad, and a specialized global positioning system (GPS) receiver. In certain embodiments, when the MDD 295 is not being used, it can reside on a cradle (not shown) for charging and to transfer data to and from the memory. In certain embodiments, the data transfer takes place during a time of day when the device is not used by a business employee (e.g., mail carrier), such as between 1 AM and 5 AM for example. An embodiment of the MDD 295 is shown in FIG. 8, which will be discussed at a later point herein.

Figure 3:
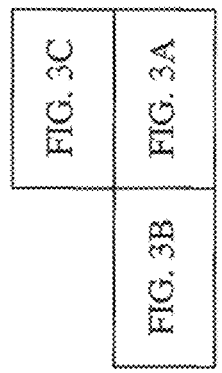
FIG. 3, comprising
Figure 3A:
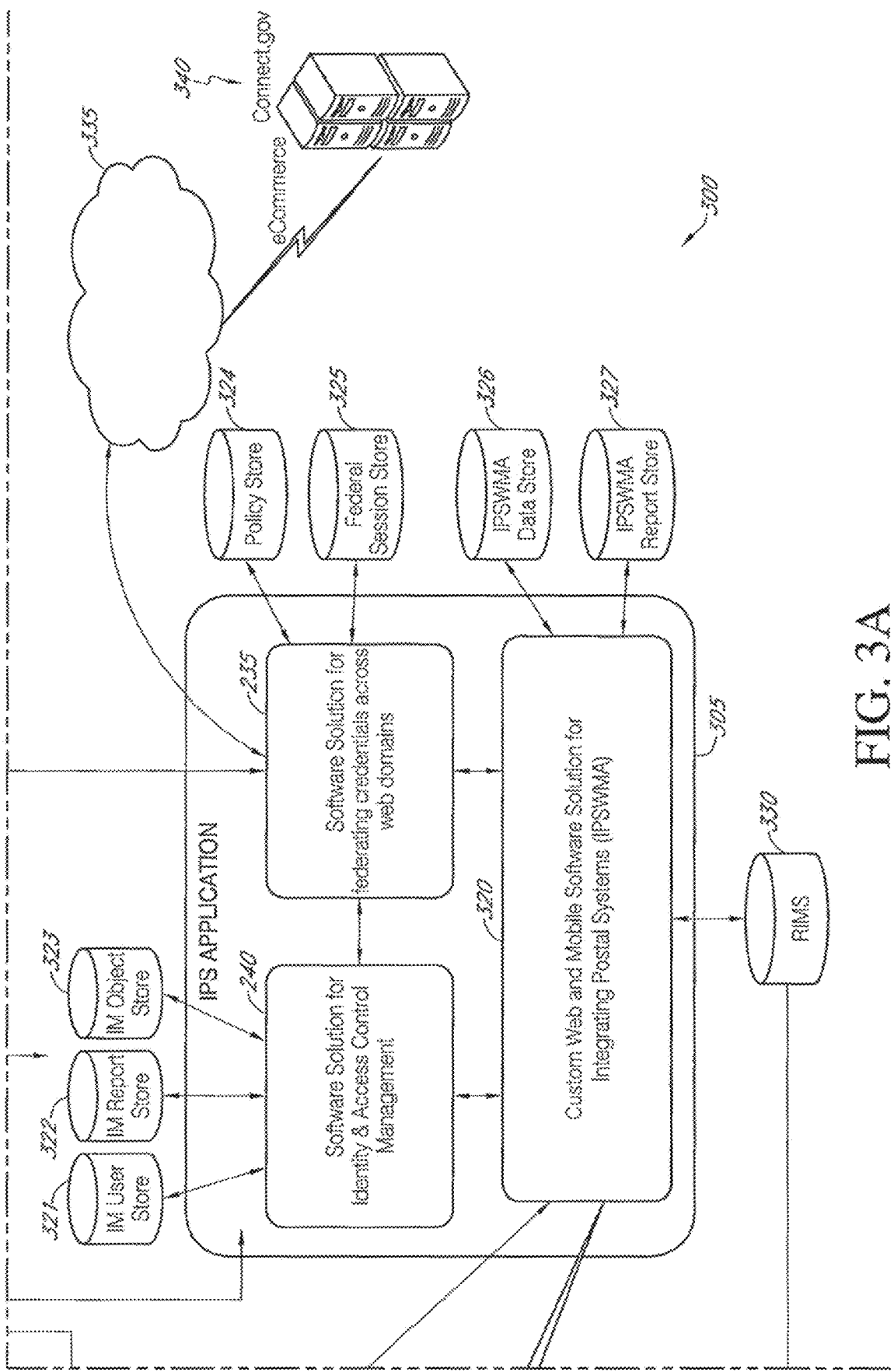
FIGS. 3A-3C, is a block diagram of an example physical architecture of elements of a system to conduct the process illustrated in FIG. 1.
Figure 3B:
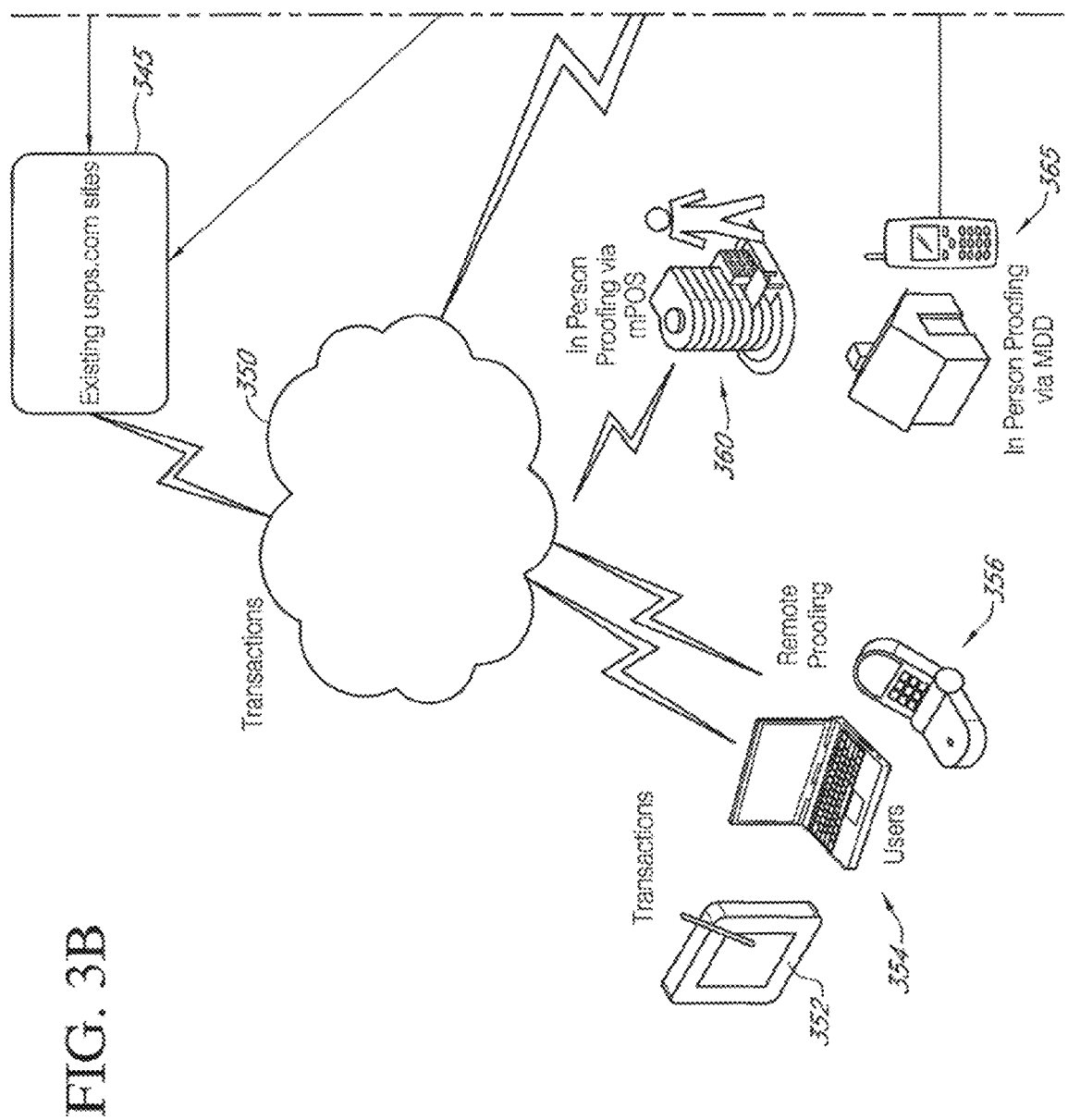
Figure 3C:
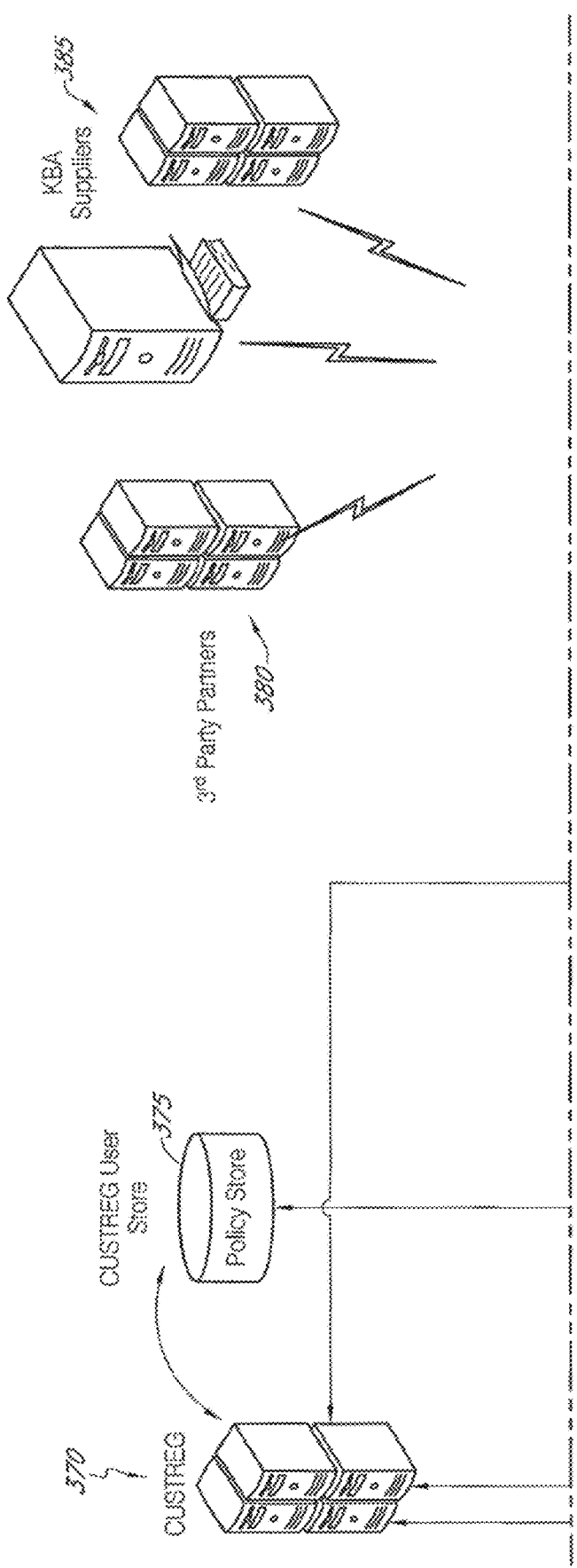

FIG. 3 shows a diagram of the arrangement of FIGS. 3a, 3b and 3c within a larger block diagram. FIGS. 3a-3c are block diagrams of an example physical architecture (300) of portions of a system to conduct the processes illustrated in FIG. 1. In certain embodiments, the servers used for identity verification are specialized with custom software developed for the service business (e.g., USPS). For example, an identity verification application can require development of additional software to execute on the servers. Architecture 300 includes an identity proofing services (IPS) application 305. In certain embodiments the IPS application 305 performs its functions and executes upon a server, such as a web based regional intelligent mail server (RIMS) 330. The IPS application 305 can be a collection of individual software components architected to integrate with existing systems of the service business to provide identity verification services through the online and retail network of the service business (e.g., USPS). The IPS application 305 can include the software solution 235 for federating credentials across web domains so the credentials can be utilized and accepted at many domains. The IPS application 305 can also include the software solution 240 for identity and access management access control management 240. These two portions communicate with each other and both communicate with a custom web and mobile software solution 320 for integrating systems. In certain embodiments, the identity and access control portion 240 communicates with several databases such as an identity management (IM) user storage 321, an identity management report storage 322, and an identity management object storage 323.

The web and mobile software solution for integrating systems 320 can be a customized application to interact between the commercially available software applications 235 and 240 in order to apply business-specific (e.g., USPS) business logic and user flow to the customized web presentation layer. The IM user storage 321 includes additional account identity attributes used in elevating a personal account from a National Institute of Standards and Technology (NIST) level of assurance one (LOA1) self-asserted registration to a NIST LOA2. The identity management report storage 322 is a database where the Report server (Business Objects) stores its own data. The identity management object storage 323 is a user account information database.

The federating credentials portion 235 is in communication with several databases such as a policy storage 324 and a federal session store 325. The policy storage 324 is a business logic and process flow database. The federal session store 325 is a cross domain log database. The custom web and mobile software solution 305 is in communication with several data bases such as a data store 326 and a report storage 327. The data store 326 is a web application server database. The report storage 327 is a web application reporting database. In certain embodiments, the IPS application 305 communicates with a network 335, such as the Internet. Through use of the network 335, a set of servers 340 are used to perform the service platform application, such as connect.gov, for ecommerce. Also in communication with the global network 335 are third party partners having servers 380 and knowledge based authentication suppliers operating on servers 385 such as shown on FIG. 3c.

As shown in FIG. 3c, a customer registration application (CustReg) 370 communicates with the IPS application 305. The customer registration application 370 communicates with a customer registration user storage 375 which also stores policies. The user store 375 is in communication with the IPS application 305. The CustReg servers 370 are also in communication with the IPS application 305. In addition, the CustReg servers 370 are further in communication with existing online application sites 345 (e.g., USPS) such as shown in FIG. 3b. The existing online application sites 345 are also in communication with the IPS application 305. The existing application sites 345 further communicate with a network 350 such as the Internet. The online application transactions communicated via the network 350 are in further communication with the IPS application 305. These online application transactions can include performing remote proofing such as using a tablet 352, a laptop or other portable computing system 354 or via a smartphone 356. The in-person proofing via a mobile point of sale device 360 is also in communication via the network 350. The in-person proofing with a service business employee (e.g., mail carrier) is performed via a mobile delivery device 365 which is in communication with the RIMS server 330. In other embodiments other configuration of the components, servers, databases, and applications can be done.

Figure 4A:
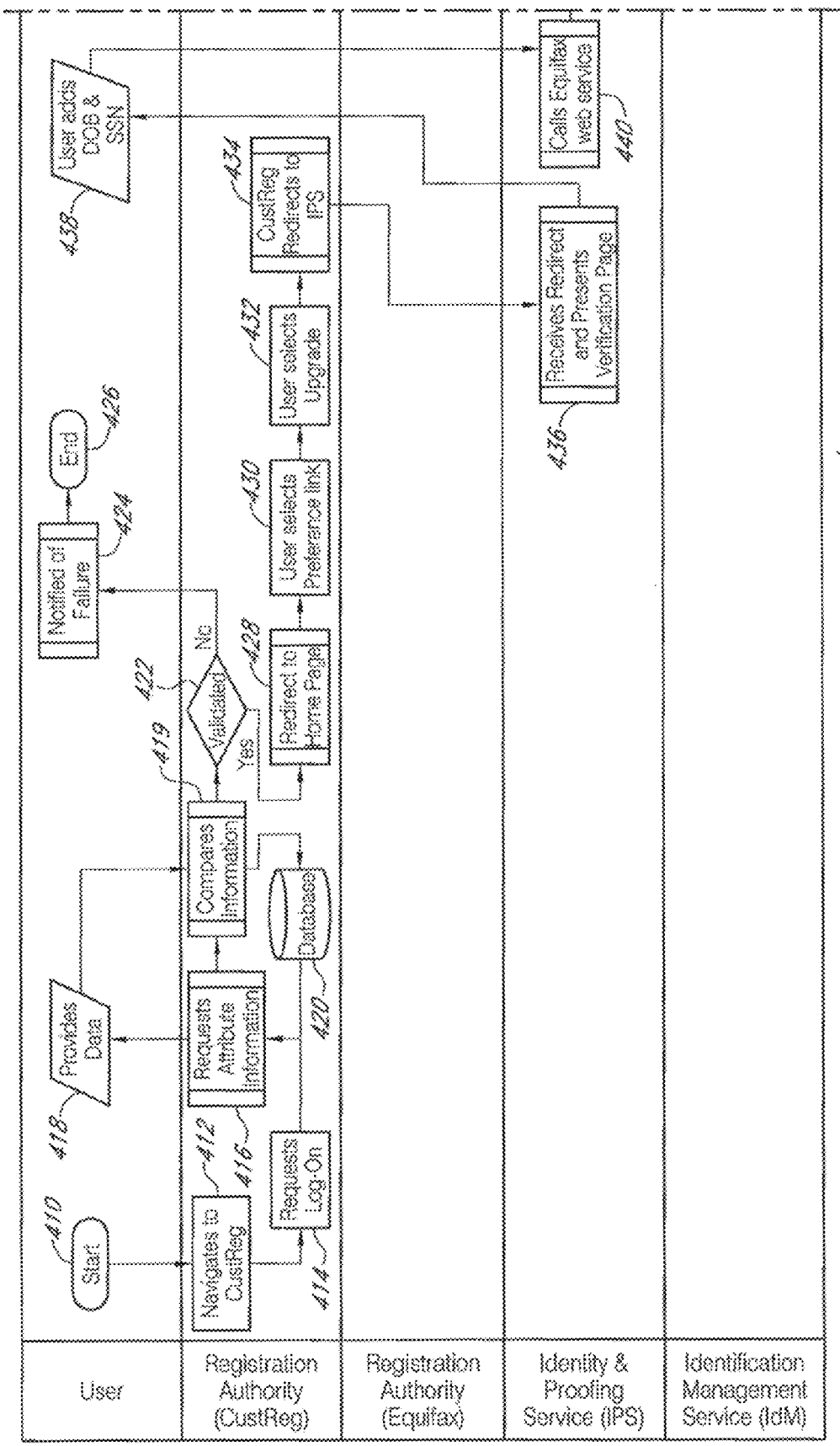
FIGS. 4A-4C, is a flow diagram of an example flow for a remote proofing identification process such as identified in FIG. 1.
Figure 4B:
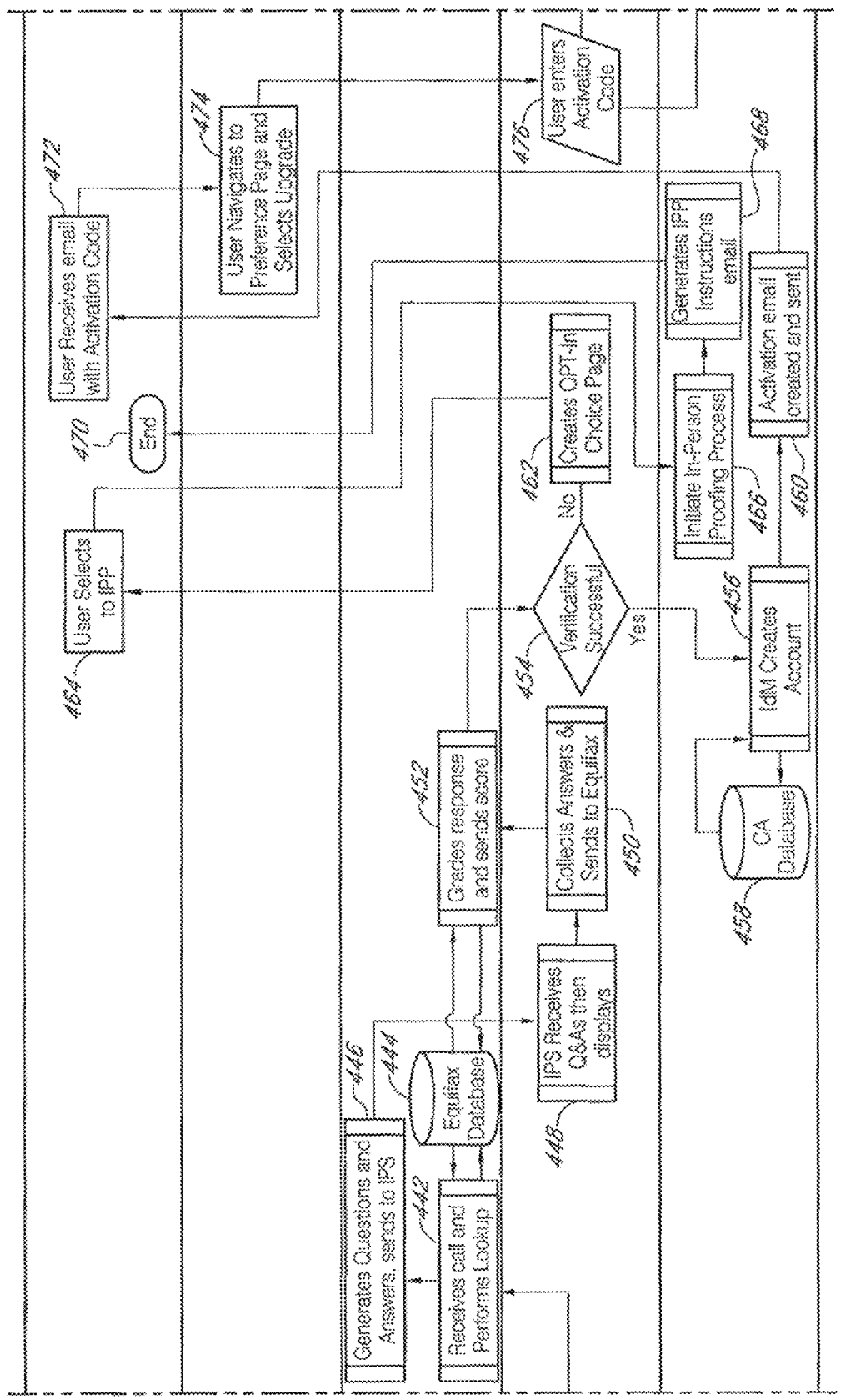
Figure 4C:
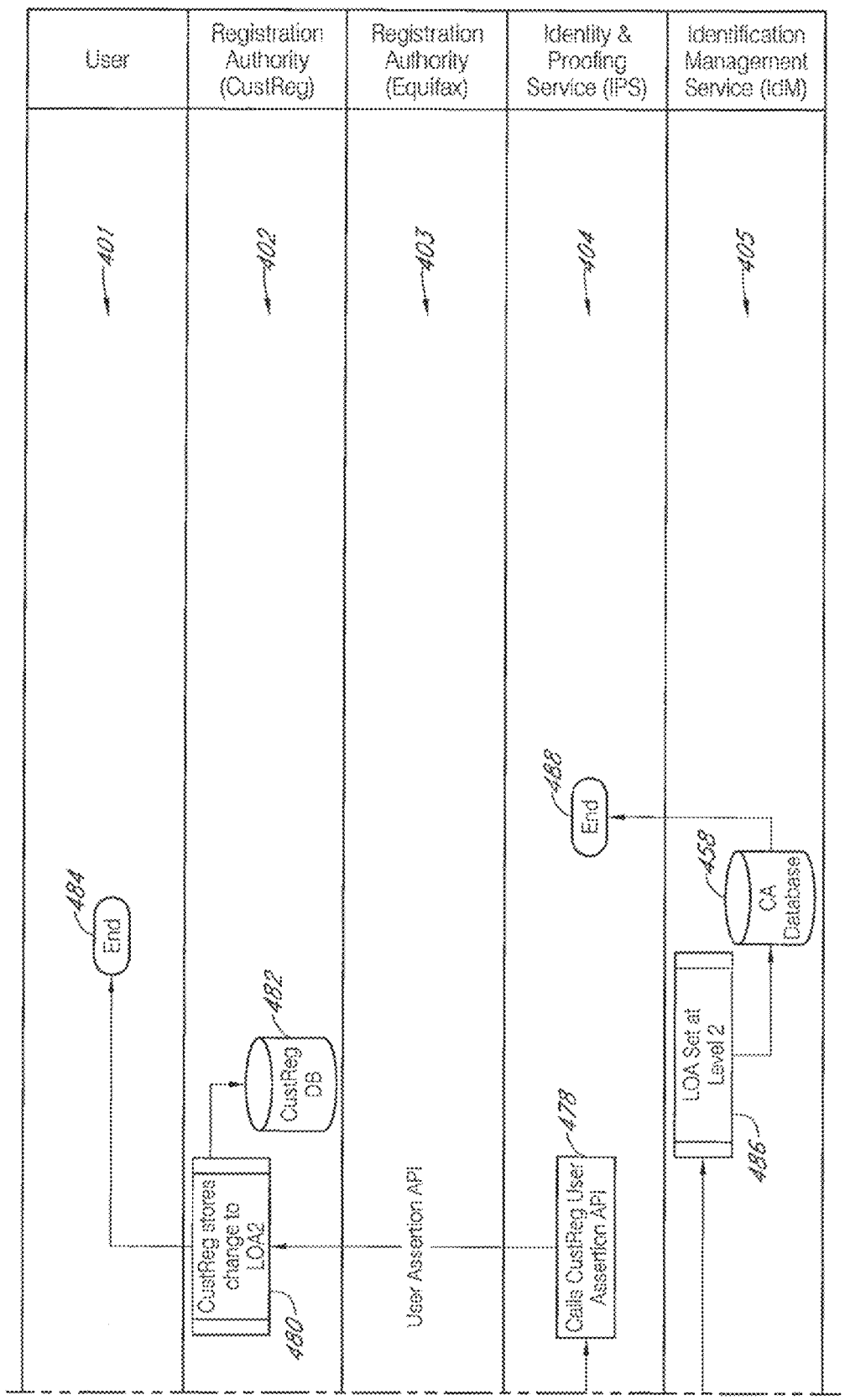
Figure 5A:
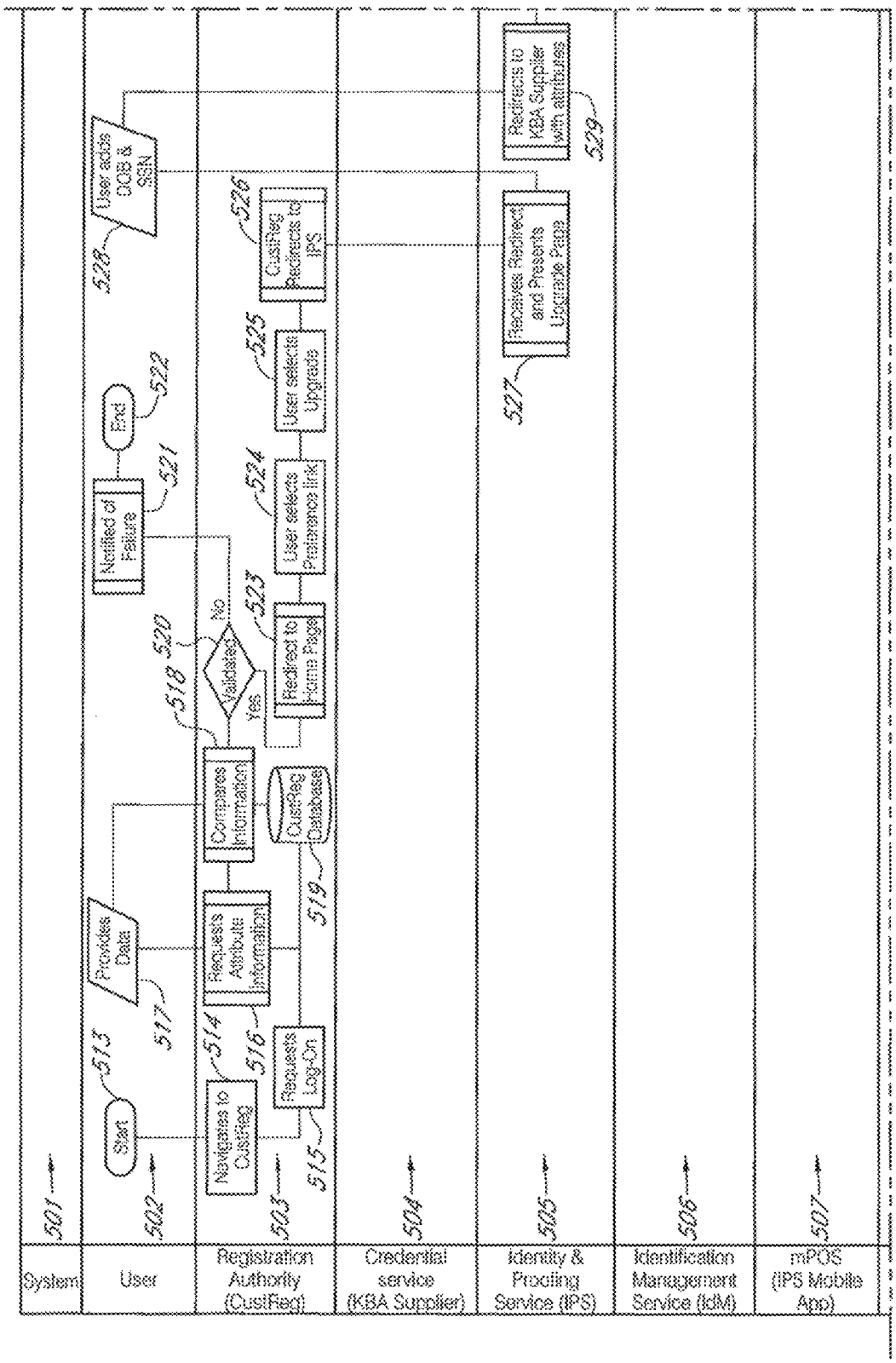
FIGS. 5A-5F, is a flow diagram of an example flow for an in-person proofing identification process such as identified in FIG. 1.
Figure 5B:
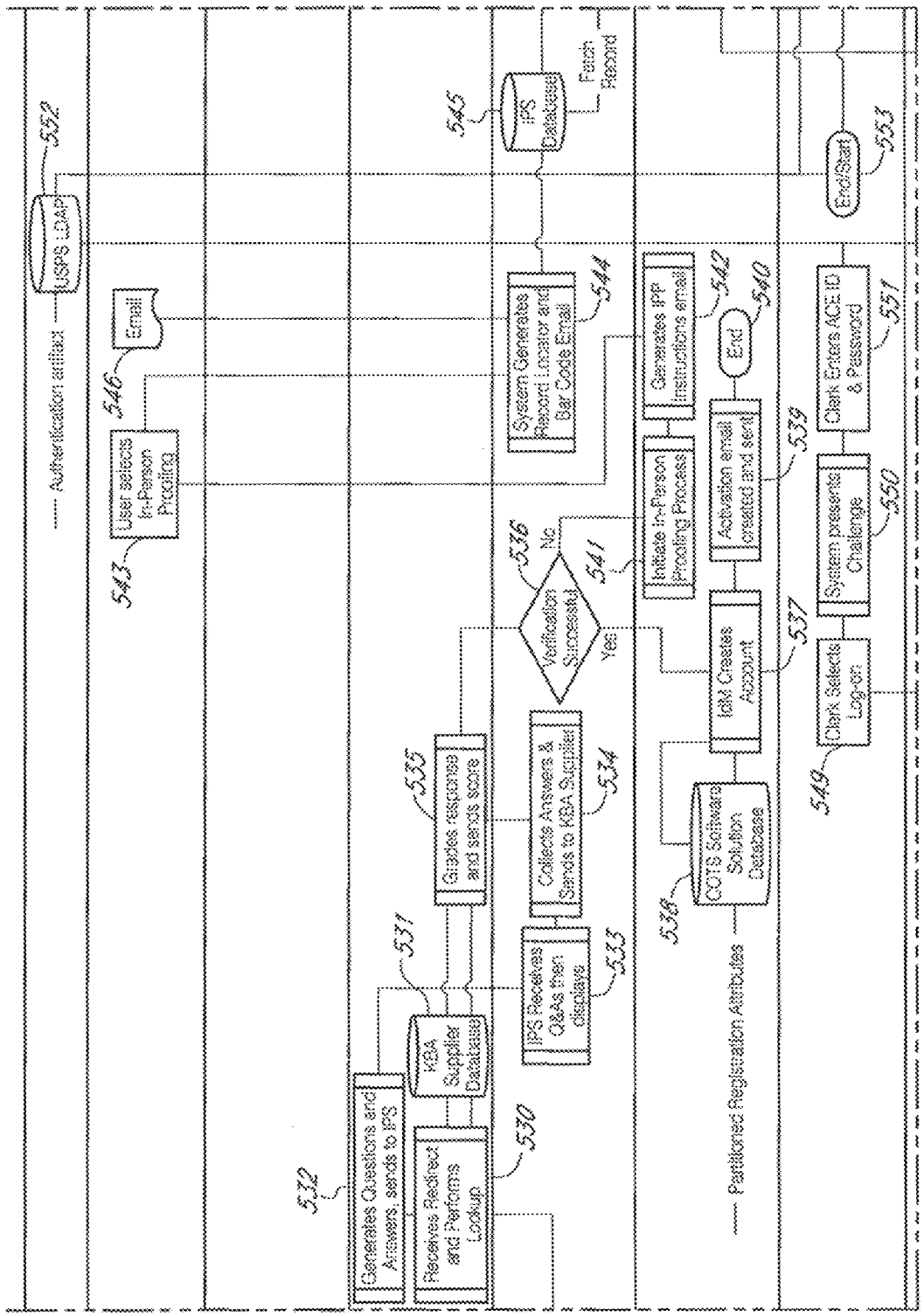
Figure 5C:
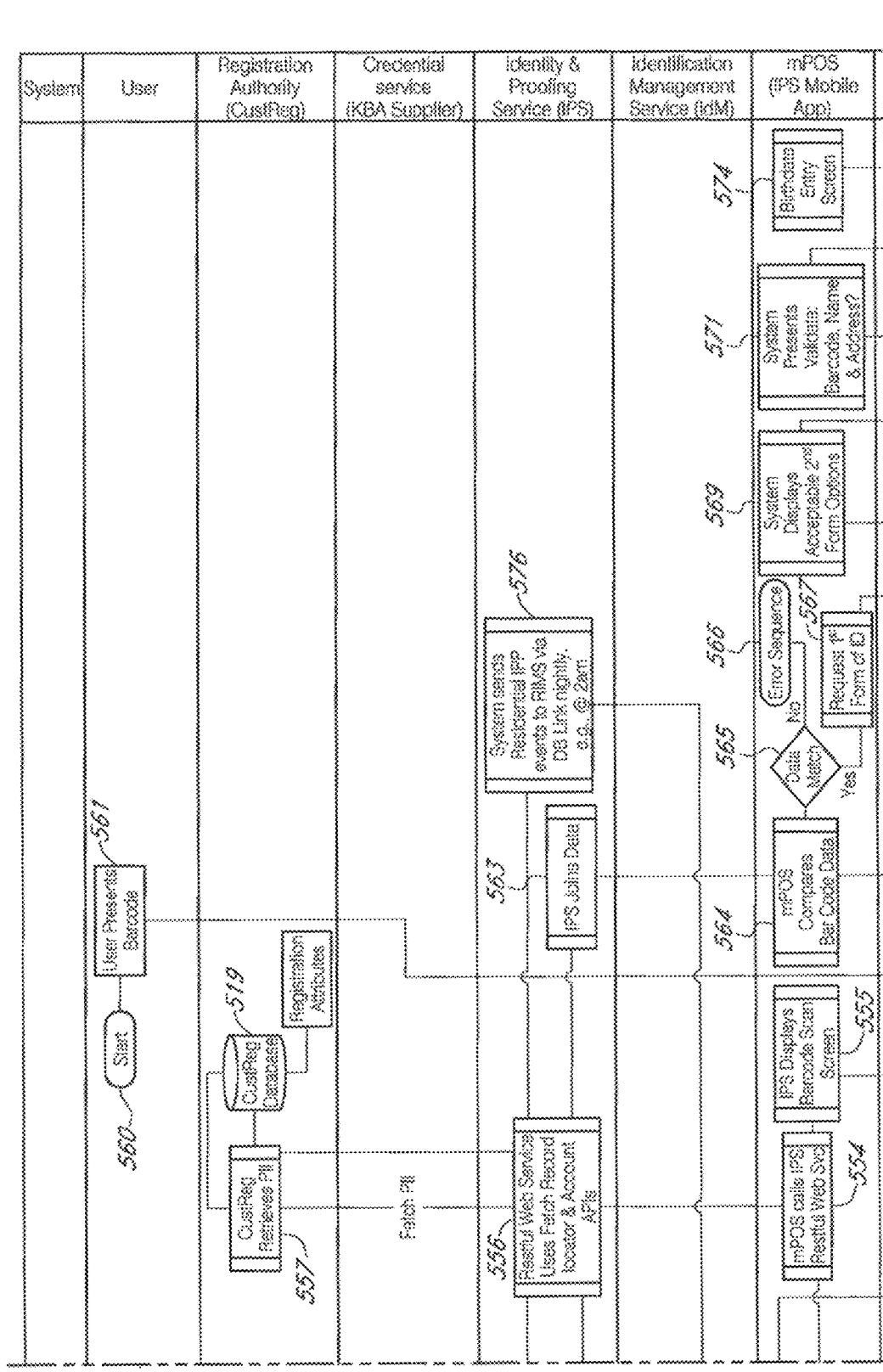
Figure 5D:
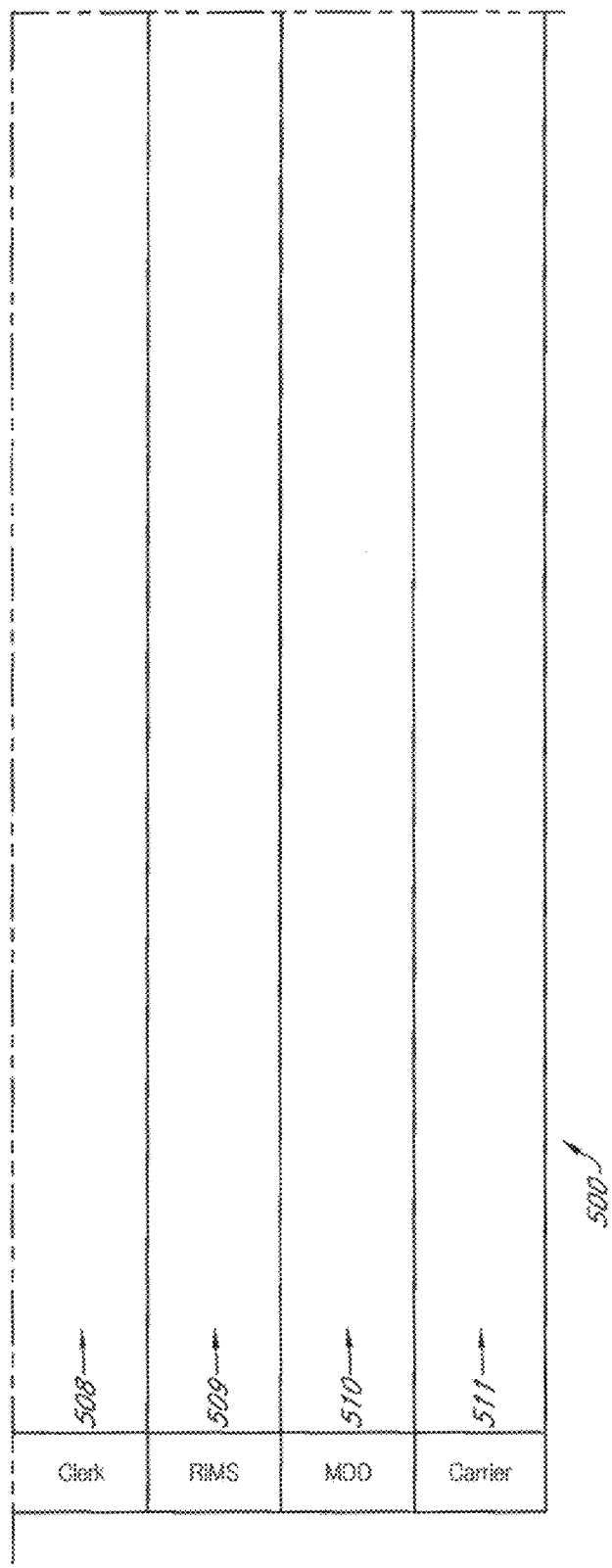
Figure 5E:
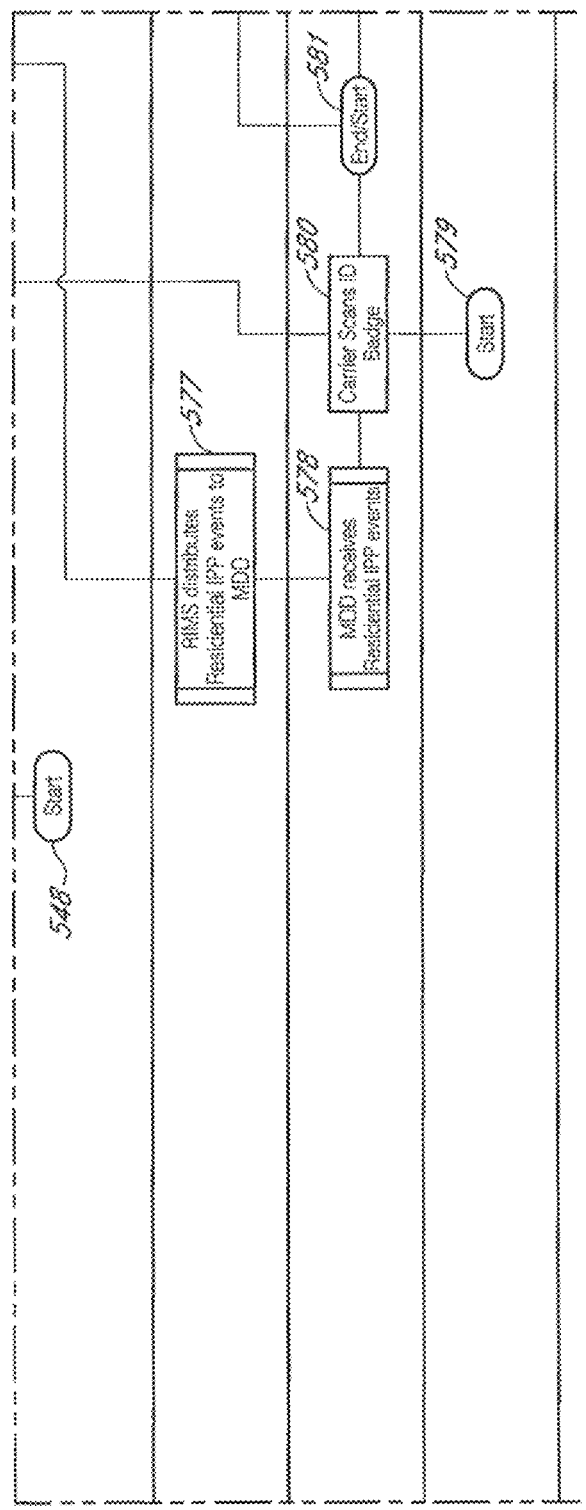
Figure 5F:
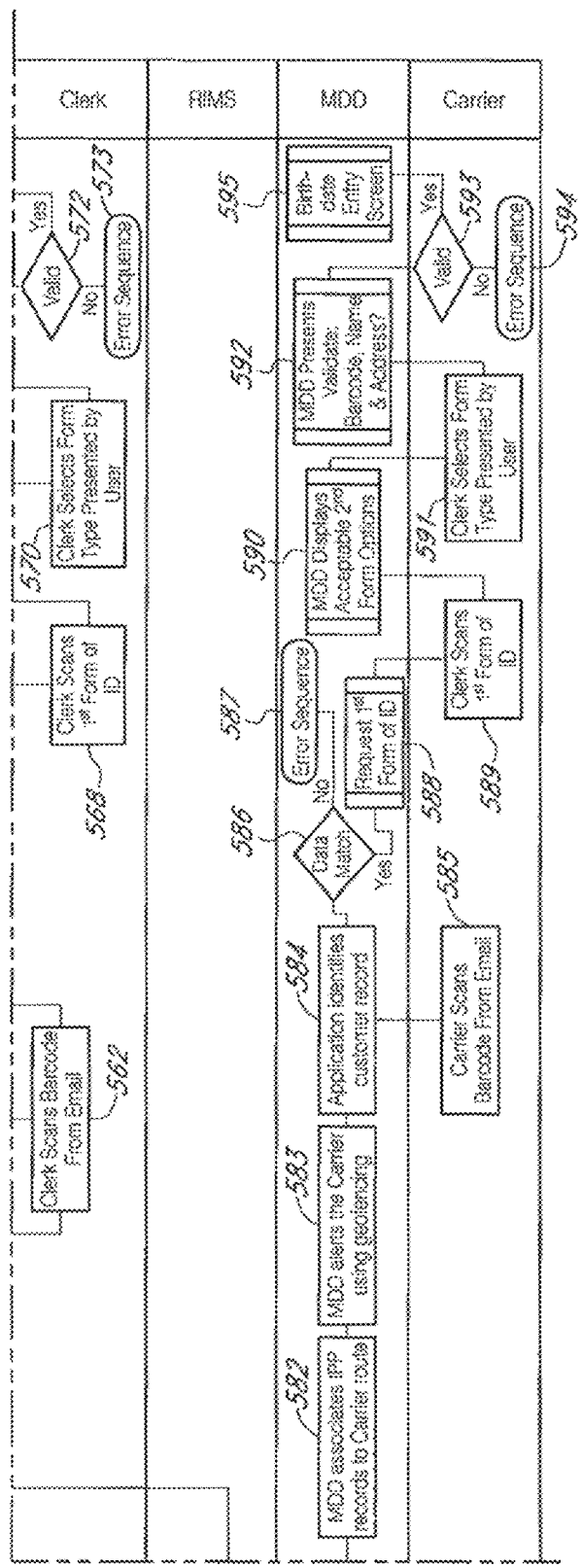

FIG. 4 shows a diagram of the arrangement of FIGS. 4a, 4b and 4c within a larger block diagram. FIGS. 4a-4c are flow diagrams of an example flow for a remote proofing identification process 400 such as identified in FIG. 1. The process 400 includes several entities performing various aspects of the process. These entities include a user 401, a registration authority, which in some embodiments is the CustReg application 402, a registration authority, which in certain embodiments is an Equifax service 403, an identity and proofing service (IPS) 404, and an identification management service (IdM) 405 for identity management. The entities are each associated with one or more processors such as shown by the system configuration 200 and/or system architecture 300.

Beginning at a start step 410, process 400 proceeds to a step 412 and navigates to a customer registration function 412. Proceeding to a step 414, system 200/300 requests a logon to be performed by the user. If the user has not previously registered with the online application, the user is requested to register which includes performing a logon. The information required can vary depending on the level of authentication required of the application being accessed. In the case of creating a basic level business account, such as for the USPS application, the user is required to provide a First Name, Last Name, Current Address, Password, Security Question, email address, and a phone number. For a LOA2 level credential, the registration process would require additional information such as a social security number (SSN) and a date-of-birth. In certain embodiments, logging on is indicative of the customer having at least a LoA of Level 1. NIST defines LOA1 as an authentication with little or unverified information. A LOA1 identifies that this logon corresponds to a returning user/account. Information entered by a user is stored at a database 420 and process 400 continues to a function 416 that requests attribute information, such as identified above. The user provides attribute data at a step 418. Proceeding to step 419, the process 400 compares the information received from the user to what was requested of the user at function 416 and updates a CustReg database 420. Proceeding to a decision step 422, process 400 determines if the logon information is valid. In certain embodiments, the encrypted hash of the current login information is compared to the information submitted for authentication. If the logon information is determined not to be valid, process 400 proceeds to a step 424 where the user is notified of a logon failure at a function 424 and process 400 ends at an end step 426. However, if process 400 determines that the logon information is valid as determined at decision step 422, process 400 proceeds to function 428 and redirects the browser to a home page. Moving to a step 430, the user selects a preference link to move to a page where the user can select to upgrade their identity credentials at a step 432.

Proceeding to a function 434, system 200/300 uses the registration authority to redirect to the identity and proofing service. At a function 436, the identity and proofing service receives the redirect and presents a verification page for the user. Proceeding to step 438, the user adds their date of birth and social security number in certain embodiments. In certain embodiments, a governmental account, e.g., a SSN, or a financial account is needed. For security purposes, certain information such as the date of birth and/or social security number is collected by an Identity Verification System (IVS). In certain embodiments, the IVS is an application, such as utilized by the USPS, to verify personal identity attributes of customers doing business with a corresponding entity. For example, this application can be a combination of commercial off-the-shelf software, third-party services providers, and customized software. It works in combination with an enterprise customer registration application to align the proper authentication process to the registration and provisioning process for external customers. In the current application, the SSN is not stored. It is only held long enough to verify against a third party service. That being stated, the collection of the SSN and the date of birth occur in the IVS system which is separated from the customer registration system to provide additional security through distributed information repositories. In summary, in certain embodiments, certain information collected during the process 400, e.g., SSN, may be purged for customer security once the proofing process is complete.

Process 400 continues at a function 440 where a call is made to a registration authority, which can be for example, an Equifax server. In certain embodiments the registration authority is a knowledge-based authentication provider. Proceeding to a function 422 system 200/300 receives a call from the identity and proofing service and performs a lookup for the particular user. In some embodiments this lookup can be performed on an Equifax, or other similar database 444. In certain embodiments, the registration authority generates the questions to be asked of the user and the service business does not keep either the information used to create the questions or the user's answers. The questions are generated at a function 446 along with answers, and both the questions and the answers are sent to the identity and proofing service. At a function 448, system 200/300 receives the questions and answers, and then displays them to the user. In certain embodiments, questions such as those shown in FIG. 11 can be used. These questions are just a sample of potential questions that can be used. Proceeding to a step 450, the identity and proofing service collects the answers from the user and sends the answers to the registration authority. At a function 452, the response from the user is graded via a lookup of the information on the registration authority's database 444 and the score is sent to the identity and proofing service. The response can be graded according to a configurable risk model that adjusts for changing fraud detection methods and generally follows industry best practices. The risk model can include accuracy and completeness of submitted attributes, frequency and recentness of prior requests associated with the attribute bundle, industry reports of known fraud associated with attribute bundles, and accuracy of responses submitted to knowledge based authentication questions.

Moving to a decision step 454 the identity and proofing service determines if there is a successful verification based on the score from the registration authority. The threshold is configurable and adjusted according to multiple factors that take into consideration risks associated with application being accessed, ease of use, and evolving fraud deterrence techniques. If the verification is successful, process 400 proceeds to a function 456 where the identification management service creates an account. The information related to the account for the user is stored in a certificate authority (CA) database 458. Process 400 then proceeds to a function 460 where an activation email, SMS or the like is created and sent by the identity management service to the user. This activation email is then received by the user at a step 472 and the activation code is included with the email. Proceeding to a step 474 the user navigates to a preference page on the registration authority application (CustReg) and selects to upgrade their credential. Proceeding to a step 476, system 200/300 receives an activation code from the user as part of the identity and proofing service. In certain embodiments, the activation code is the code previously received via email at step 472. Upon receipt of the activation code from the user, process 400 advances to a function 486 at the identification management service and sets the level of assurance (LOA) at level 2. This is further reflected in the certificate authority database 458. The steps just performed describe single factor authentication and do not enable setting a LoA of Level 3 because that requires multi-factor authentication.

After setting the level of assurance, process 400 ends at an end step 488. In parallel with function 486, the activation code received at step 476 is used at a step 478 to call the registration authority (CustReg) user assertion application programing interface (API). The user assertion API is used by the registration authority to store a change to the level of assurance at function 480 in the CustReg database 482. At the completion of updating the LOA to level 2, module 400 ends at an end step 484.

In some embodiments, at this time, a credential or token is tied to LOA2. The proofing event is bound to the credential or token, and therefore, if there are any changes related to the customer, he or she will need to perform another proofing event.

Returning to the decision step 454, if the verification is not successful, process 400 proceeds to a function 462 where the identity and proofing service creates an opt-in choice page that is sent to the user. At a step 464, the user selects to utilize the in-person proofing (IPP) process. Moving to a function 466, the identification management service initiates the IPP process. Continuing to a function 468, the identification management service generates an IPP instructions email that is sent to the user at step 470 and the process 400 ends. The instructions email informs the user of the in-person proofing process such as performed using the flow described in FIGS. 5a-5f.

FIG. 5 shows a diagram of the arrangement of FIGS. 5a-5f within a larger block diagram. FIGS. 5a-5f are flow diagrams of an example flow for an in-person proofing identification process 500 such as identified in FIG. 1. Process 500 includes various entities that perform the steps of the process. In one embodiment, these entities include an identity and proofing system, such as a USPS system 501, a user 502, a registration authority (CustReg) 503, a credential service for knowledge based authentication (KBA) supplier 504, an identity and proofing service (IPS) 505, an identification management (IdM) service for ID management 506, a mobile point of sale (mPOS) application (IPS mobile app) 507, a postal clerk 508 (at a USPS facility), a regional intelligent mail server (RIMS) 509, a mobile delivery device (MDD) system 510, and a postal mail carrier 511. Each of entities 501 through 511 are represented on FIGS. 5*a*, 5*b*, 5*c*, 5*d*, 5*e* and 5*f* by a corresponding horizontal portion of the figures stretching across either FIGS. 5*a* 5*b* and 5*c* or across FIGS. 5*d*, 5*e* and 5*f*. The entities 501-507 and 509-510 are each associated with one or more processors such as shown by the system configuration 200 and/or system architecture 300.

Process 500 begins with the user 502 at a start step 513 and proceeds to step 514 so as to navigate online to a registration step with the registration authority (CustReg), such as at the USPS website. Proceeding to step 515, the registration authority requests the user to perform a log-on. Proceeding to a function 516, the registration authority requests attribute information of the user. Moving to step 517, the user 502 provides the data requested by the registration authority. Continuing to a function 518, the registration authority compares the information received from the user 502 with that requested by the authority and checks a customer registration (CustReg) database 519. Any new information received from a user is stored in the CustReg database 519. Proceeding to a decision step 520, the registration authority determines if the user 502 can be validated based on the provided information from the log-on. If the user cannot be validated as determined at decision step 520, the process 500 continues to a function 521 where the user is notified of the log-on failure, and process 500 ends at an end step 522.

However, if the user has been validated as determined at decision step 520, process 500 continues to a function 523 to redirect to a homepage of an application such as USPS. Proceeding to step 524, the user can select a preference link on the page, and at step 525 selects to upgrade his or her credential. Advancing to a function 526, the registration authority 503 redirects the processing and user to the identity and proofing service 505, and module 500 continues at a function 527. At function 527, the identity and proofing service receives the redirect from the registration authority and presents an upgrade page to the user 502. Advancing to a step 528, the user 502 adds information such as date of birth and social security number and/or other information desired by the process 500. The user-entered information and the user are redirected to a function 529, which redirects to a third party knowledge based authentication (KBA) supplier along with the attributes previously entered.

Proceeding to a function 530, the credential service provider (KBA supplier) 504 receives the redirect at function 530 and performs a lookup of the user using a KBA supplier database 531. Moving to a function 532, the credential service provider generates both questions and proposed answers, and sends this information back to the identity and proofing service 505. Moving to a function 533, the identity and proofing service receives the questions and proposed answers and displays them for the user to see.

In certain embodiments, example questions and answers are provided on a screen such as shown in FIG. 11. Moving to a function 534, the identity and proofing service collects answers from the user and sends the answers to the KBA supplier 504. Moving to a function 535, the credential service provider receives the answers from the identity and proofing service and accesses the KBA supplier database 531. Based on this information, the credential service provider 504 grades the responses and sends a score to the identity and proofing service 505. The algorithms for determining the risk score associated with the attribute bundle are the unique intellectual property of each third party provider. This results in a unique and separate configuration for each integration that the identity and proofing system, such as the USPS system, establishes with each service provider based upon the databases available to the third party. During the integration process, the identity and proofing system provider works with the third party on the various configuration points to achieve an aggregated risk model that is acceptable for the identity and proofing system provider's business needs. For example, for certain USPS applications a score of three of five successfully answered KBA questions would be sufficient. However, for other USPS applications a score of three of five in combination with a successful response on a specific attribute combination could be the threshold. Moving to a decision step 536, the identity and proofing service determines if a verification has been successfully done.

If the verification is successful, module 500 proceeds to the identification management service 506 at a function 537 where an account is created for the user and data is stored in a software solution database 538. Database 538 receives partitioned registration attributes corresponding to each of the users using the identity and proofing service. After the account is created, an activation email is created and sent to the user and then module 500 ends at an end step 540. However, if verification is not successfully completed as determined at the decision step 536, the module 500 proceeds to a function 541 and initiates an in-person proofing process. Proceeding to a function 542, the identification management service generates an in-person proofing instructions email and sends that to the user 502. At a step 543, the user selects the in-person proofing link in the email and then processing advances to a function 544. At function 544, the identity and proofing service 505 generates a record locator and barcode email. The email is sent to the user 502 as email 546 and the information from the email regarding the barcode is stored in an identity and proofing service database 545. An example email illustrating the barcode is shown in FIG. 17A.

If the user has opted to perform the in-person proofing at a business location with an employee (e.g., Post Office with a postal clerk), the process 500 begins this phase at a start step 548. Process 500 then moves to step 549 where the clerk logs-on an mPOS device, or other device for interfacing with the user, using an IPS mobile application at step 549. The clerk selects to log-on to the application and process 500 proceeds to a function 550 where the application presents a challenge to the postal clerk. Proceeding to a step 551, the clerk enters an advanced computing environment (ACE) identifier, for example, and a password. In other embodiments, other identifiers can be used. Module 500 proceeds by storing portions of the information entered by the clerk in a USPS lightweight directory access protocol (LDAP) database 552, for example. The LDAP database 552 is configured to store authentication artifacts and is used to authenticate the clerk's credentials to ensure that the proofing activity is being performed by an authorized agent. The process 500 proceeds to start step 553 then continues on to a function 554 where the IPS mobile application 507 calls the identity and proofing service (IPS) RESTful web service. REST is an architectural style for networked hypermedia applications and is used to build Web services that are lightweight, maintainable, and scalable. A service based on REST is called a RESTful service. REST is not dependent on any protocol, but most RESTful services uses HTTP as their underlying protocol In parallel to calling the RESTful web service, the mPOS displays a barcode scan screen at a function 555. A barcode scan screen can be utilized.

In parallel to the display of the barcode scan screen, process 500 moves to a function 556 where the RESTful web service uses a fetch record locator and account APIs to fetch a record from an IPS database 545 corresponding to the user and also fetches personally identifiable information by calling a function 557 performed by the registration authority. Function 557 retrieves the personally identifiable information (PII) from the CustReg database 519 which has registration attributes corresponding to the user. Once the RESTful web service obtains the records from the IPS database 545 and the CustReg database 519, the data is joined by IPS 505 at a function 563. In parallel, with at least previous portions of process 500, the user starts at a step 560 and presents the barcode information at step 561 that they have from the email provided back at step 546. The barcode from step 561 is scanned by the clerk at a step 562 such that the barcode from the user's email is obtained.

Proceeding to a function 564, the mobile point of sale device using the IPS mobile application compares the barcode data from the scanned email against the information joined at function 563. Proceeding to a decision step 565, the IPS mobile application on the mPOS determines if there is a data match between the information corresponding to the barcode scanned from the email and the information previously obtained from the CustReg database and the IPS database. If there is no data match as determined at decision step 565, process 500 moves to an error sequence 566 to notify the clerk that there is a lack of a data match. At this point, various error sequences can be performed such as notifying the user that the barcode does not match the previously obtained information. However if the data match at decision step 565 is successful, process 500 proceeds to a function 567 where the clerk requests a first form of identification from the user.

In certain embodiments, the customer is asked for identification to scan on the succeeding screen and all forms of identification must be current. In certain embodiments, accepted forms of identification include: state driver's license, state non-driver's identification card, uniformed services identification card, or passport. In certain embodiments, secondary forms of identification can be accepted, but they may be only required in certain embodiments when the primary identification does not list an address or has an outdated address. These accepted secondary forms of identification can include: a lease, mortgage or deed of trust, a voter or vehicle registration card, or a home or vehicle insurance policy. The clerk can enter the selected form of identification to scan in such as an mPOS screen to select the form of ID.

Moving to a step 568 the clerk scans this first form of identification that has been selected. In certain embodiments, the back of the first form of identification is scanned for a barcode using a PDF417 format. In certain circumstances such as previously mentioned, a secondary form of identification may be requested such as performed at function 569 where the mPOS application displays acceptable second form of ID options. In certain embodiments, the secondary forms of ID are listed on a screen display. The address on the secondary form of identification must match the address in the system in certain embodiments and the secondary form of identification must be current to verify the customer's address. Proceeding to a step 570 the clerk selects a form type presented by the user on the mPOS device screen and processing continues at a function 571. At function 571, the mPOS device presents a validate screen to validate the barcode name and address to match that presented by the user's identification. The clerk can enter in a yes or no in a screen. In other embodiments other information may be presented and compared for a validation match.

The clerk validates the match at a decision step 572. If the validation is not correct, the process 500 advances to an error sequence 573. However, if proper correspondence and validation is made, as determined at decision stage 572, the process 500 continues to a function 574 where a birth date entry screen is presented such as to obtain the user's birth date or other user information. A screen display for part of the validation process where the customer's date of birth is entered can be used. Process 500 can compare the customer's date of birth against information in CustReg database 519 to verify that there is a match. At that point, process 500 can assert that the proofing is completed and the identity validation is complete. The system can generate a proofing confirmation code and display it on the mPOS device for the clerk and the customer. At this time, a credential or token is tied to LOA2. The proofing event is bound to the credential or token, and therefore, if there are any changes related to the customer, he or she will need to perform another proofing event. The customer then receives a confirmation email, SMS or the like with the confirmation code and at that point, the customer can login to the online application (e.g., USPS) at a LOA2 level and perform other functions that are desired. In certain embodiments the clerk can print a hardcopy of the confirmation code for the customer.

In another aspect of the system, process 500 utilizes in-person proofing via a mobile worker (e.g., postal carrier) for the business utilizing a mobile delivery device (MDD) system or similar system. In certain embodiments, the customer can set an appointment for a particular day of the week up to a preset number of days in advance, and can also set up a timeframe window for the validation event at his or her residence, such as for a preset window of hours, e.g., two hours. In this aspect, system 200/300 using the identity and proofing service (IPS) 505 performs a function 576 to send residential in-person proofing events via a database link to a server (e.g., the regional intelligent mail server (RIMS)) nightly, for example, at 2 AM or another predetermined time or in a range of time with low network traffic. In other embodiments, in-person proofing events can be at business locations of the users. At a function 577, the RIMS 509 further distributes one or more residential in-person proofing events preferably at a time with low network traffic to the mobile delivery device of a particular carrier corresponding to one or more particular customers that are on their route. Proceeding to a function 578, the MDD receives the residential in-person proofing events for the particular day of that particular carrier.

In certain embodiments, the MDD resides in a cradle or other location for charging of the battery when the carrier is not out on a route. During this time the MDD receives data for the next period that the carrier is on his or her route. To do so, the MDD cradle includes an Ethernet data connection in addition to providing power for charging the MDD. The data can be transmitted via a hypertext transfer protocol (HTTP), and in certain embodiments, a hypertext transfer protocol secure (HTTPS) is utilized for identity verification, for example, on the communication line on a port of the cradle. In other embodiments, other protocols can be used for data transmission and/or identity verification. In certain embodiments, this data transfer to the MDD occurs during the night such as between midnight to 5 AM, for example. In other embodiments, other times or a set time can be used for transferring the data. This can be done in a batch process for all the MDDs of the business at night so as to conserve bandwidth and cost in comparison to sending data wirelessly to the MDDs while the carriers are on their routes. In certain embodiments, tens of thousands of MDDs may receive data transfers for their routes. During the residential in-person identity verification, information collected during the verification is transferred from MDD to the regional intelligent mail server (RIMS) and then to the identity proofing service (IPS) as the data is collected, in certain embodiments. In other embodiments, the data from one or more MDDs can be transferred in batches at certain times of a day, for example.

A particular business employee or agent (e.g., postal carrier) starts the in-person proofing portion of process 500 at a step 579 and scans his or her identification, e.g., ID badge, at step 580. This event is recorded in the lightweight directory access protocol (LDAP) database 552 as an authentication artifact. Process 500 continues at end/start step 581 and moves to a step 582 where the MDD associates the in-person proofing records to the employee's route. Proceeding to a step 583, the MDD alerts the employee using his or her GPS coordinates and a geofencing function. In certain embodiments, a latitude and longitude along with a radius can be used to establish a geofence around a customer's residence location, in other embodiments, other ways to identify a location such as a zip+4 code can be used. In certain embodiments, when the employee approaches a predetermined distance of the residence of the customer the MDD alerts the employee.

In certain embodiments, screen displays of the MDD are used so that the carrier can identify the IPS customers that are within a certain distance from the carrier's location. An example of this can be where there are two customers identified by address and distance. In other embodiments, time of day checks can be made to verify that the carrier is at locations expected for his or her route at certain times of the day. Alternatively or in addition to performing the previously described time of day check, a time of day check can be done to provide an alert to the user on the status of the carrier. For example, an alert can be an email or text message that notifies the customer that the carrier is within a certain timeframe, e.g., 20 minutes, of the user's location, and to please ready your ID materials. Another example can be an alert that is triggered if the carrier is stuck in traffic and is behind his or her schedule by 30 minutes, for example.

When the carrier arrives at the location of the customer, the carrier scans the barcode from the email that the customer has previously received at a step 585. In certain embodiments, the scanning of the barcode can be performed using the MDD by pressing a button on the side of the device. Proceeding to a step 584, process 500 identifies the customer record and compares the barcode that has been scanned from the user's email hardcopy. In other embodiments, the email can be displayed on a customer's smartphone, tablet, or other devices. Proceeding to a decision step 586, the MDD determines if there is a match between the scanned barcode from the email and the IPS database. If it is determined at decision step 586 that there is no match, process 500 proceeds to a step 587 where system 200/300 causes an error sequence to start which generates and sends or provides a notification to the customer that there is a mismatch between their barcode from their email and previously provided information. However if there is a data match, as determined by decision step 586, process 500 proceeds to a function 588 where system 200/300 causes to display a notification requesting a first form of identification from customer. In certain embodiments, a screen can be displayed for the carrier to request identification of the customer including a primary form or a secondary form of identification. In certain embodiments, all the forms of identification must be current. An example screen listing several forms of primary identification can display selections for state driver's license, state non-driver's identification card, uniformed services identification card, or passport.

Proceeding to a step 589, the carrier scans a first form of identification such as previously selected. An example of scanning can indicate that the carrier can scan the barcode or other identifier on the ID by pressing a button on the side of the MDD. In certain embodiments, the back of the first form of identification is scanned for a barcode using a PDF417 standard. Other standards can be used in other embodiments. In certain embodiments, the barcode can have the customer's name, address, and date of birth. Other data collected can be the carrier's name, GPS breadcrumb data, and time of scan. The GPS breadcrumb data can confirm a carrier is travelling along a known or assigned route. The GPS breadcrumb data can be used as further validation that the identity proofing events are valid and trustworthy.

In certain circumstances, a secondary form of ID may be needed as described at function 590 where the secondary form options are presented. After the carrier selects a secondary form of identification that the customer has at step 591, the system 200/300 presents a validation screen requesting the carrier to determine if the information provided on the ID(s) presented by the customer matches the information of record in the system as previously provided by the customer at an earlier time. Checking if there is a match of identification information such as barcode ID, name and address, the carrier can select the appropriate yes or no button on the MDD according to whether there is a valid match at a function 592.

If it is determined that the information matches previously stored information at a decision step 593, process 500 advances to a function 595 where the birth date of the customer is requested. However, if the information does not match, as determined at decision step 593, process 500 advances to an error sequence step 594 to notify the customer of the lack of a match with the data. If the match has been made at decision stage 593 and the birth date entry information corresponds to the customer's record of previously obtained information, then the system 200/300 causes the MDD to provides a validation complete screen to the carrier. The system 200/300 also causes a notification to be provided to the customer that the in-person proofing process is complete. At this time, a credential or token is tied to LOA2. The proofing event is bound to the credential or token, and therefore, if there are any changes related to the customer, he or she will need to perform another proofing event. In some embodiments, the system 200/300 generates and sends a confirmation notification with a confirmation number to the customer via email, SMS, and the like. In certain embodiments, certain information collected during the process 400 or process 500, e.g., a SSN, may be purged for customer security once the proofing process is complete.

At this point, the customer can login to the online application (e.g., USPS) at a LOA2 level and perform functions that require a LOA2 using the credentials generated from process 400 or 500. For example, the customer can pay for COD mail, track mail, change a delivery location, or conduct a delivery locker pickup of mailed merchandise. In certain embodiments, if the customer has a mobile computing device with near field communication (NFC) capabilities and selects a link button on his or her confirmation email while the computing device is nearby in NFC range, a token can be downloaded to the computing device. In certain embodiments the token can be a one-time use token such as for picking up merchandise at a delivery locker.

In certain embodiments, remote proofing is attempted first before in-person proofing is offered. That is, the user is by default presented with the remote knowledge based authentication (KBA) prior to receiving the option for in-person proofing. However, in other embodiments, the user can bypass the remote identity verification and be immediately directed to in-person proofing. This service can give users at qualified addresses an option for selecting to perform in-person identity verification at a residential address, a service business location, or a business address of the customer.

Figure 6:
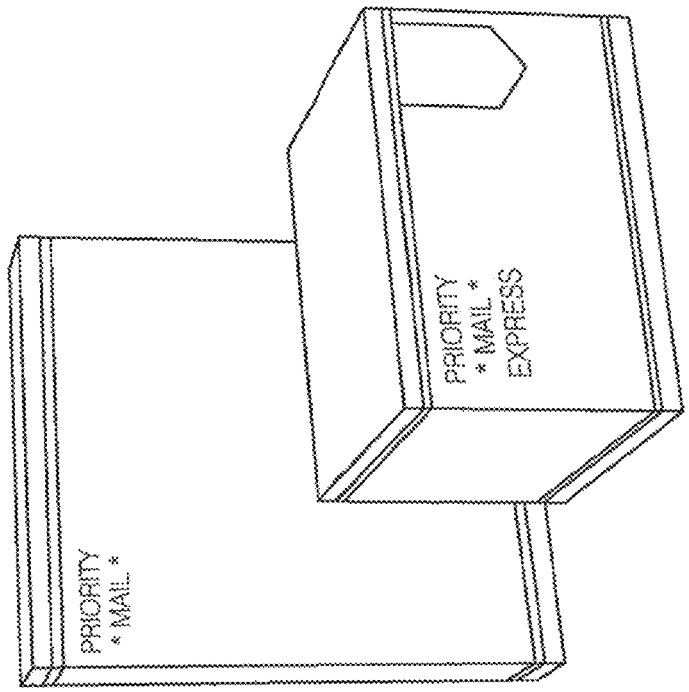
FIG. 6 is an example screen display when a customer desires to use an online application such as the My USPS website.

FIG. 6 is an example screen display when a customer desires to use the online application website (e.g., USPS), for example. In some embodiments, certain actions in the online application can only be made if the customer has a level of assurance (LOA) 2 or better.

Figure 7:
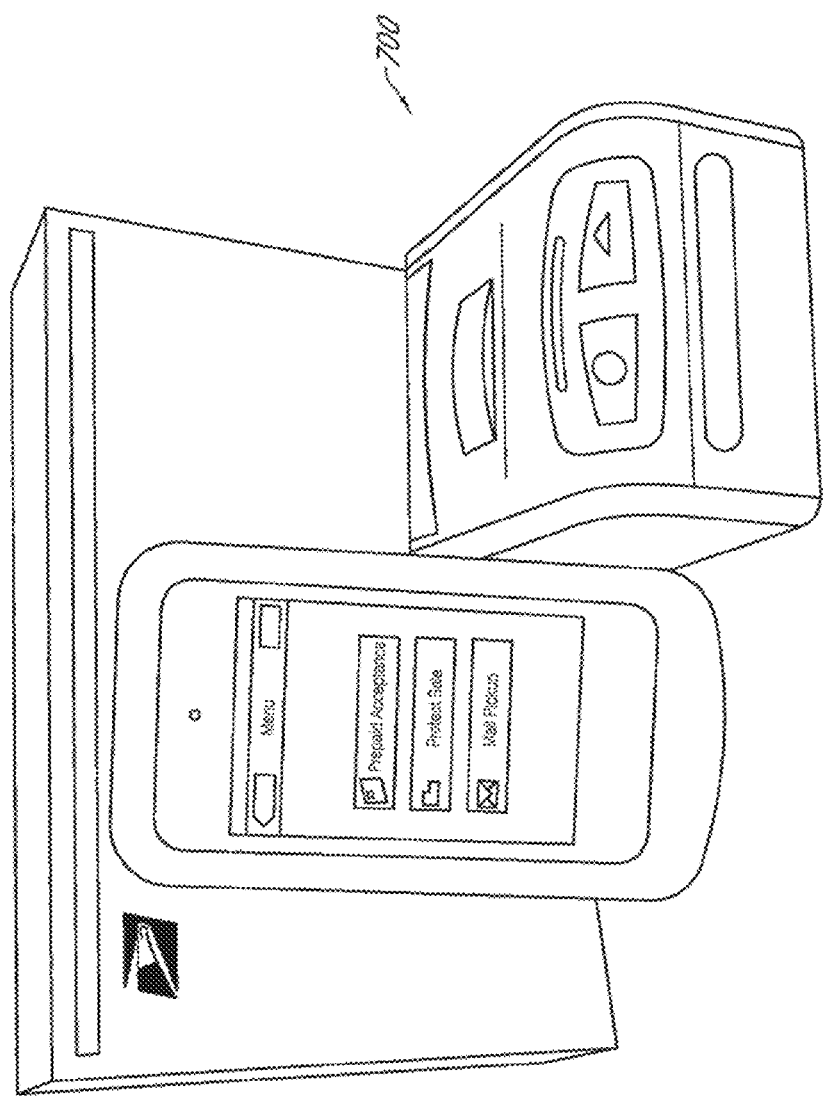
FIG. 7 is an illustration of an example mobile point of sale (mPOS) device, such as utilized in a USPS location.
Figure 8:
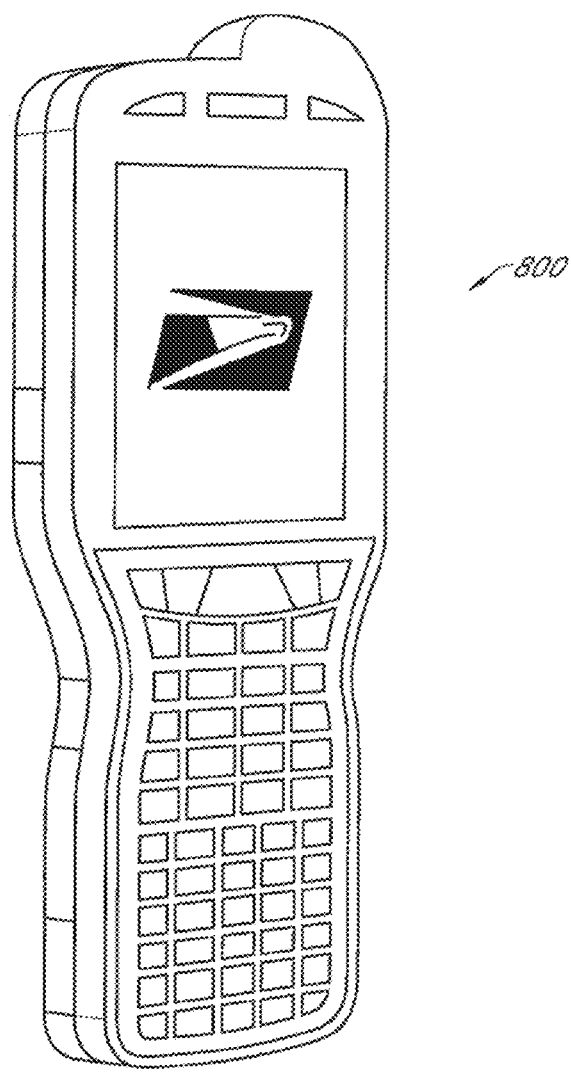
FIG. 8 is an illustration of an example mobile delivery device (MDD) system, such as utilized by a carrier at a delivery location.

FIG. 7 is an illustration of an example mobile point of sale (mPOS) system 700, such as utilized in a business location. The mPOS can be a specialized machine having customized components and functionality configured for use by the business (e.g., USPS). In certain embodiments, the mPOS uses a custom iPod Touch hand-held computing device which is in data communication with a portable receipt printer and a postage printer. In certain embodiments, the mPOS uses the iOS operating system and special purpose software developed to the specifications of the business for the identity verification and other applications it supports. In certain embodiments the mPOS can accept payments by swiping credit cards or non-PIN debit cards. A customer can choose to accept a hard-copy receipt or have one emailed to a personal email address.

FIG. 8 is an illustration of an example mobile delivery device (MDD) system 800, such as utilized by an employee of the business (e.g., carrier) at a delivery location. The MDD includes at least a scanner/imager, a keypad and a display screen as input/output components, and also includes a communications subsystem to receive various communications, such as a list of residential in-person proofing events for the carrier. The MDD also includes a processor and memory for storing at least the residential IPP events and results. The MDD further includes a geographical location component, such as a GPS circuit. The MDD uses the scanner/imager to capture a 2-D barcode or other type of code on a driver's license or other form of acceptable identification for the proofing procedure. In certain embodiments, the scanner/imager is designed for barcode capture. In some embodiments, the MDD can be manufactured by Honeywell and can use the Windows Mobile operating system. In other embodiments, other operating systems can be utilized. Some components of the MDD are specialized for speed, battery consumption, ruggedness, and so forth such that the MDD cannot be considered a general purpose computer. The MDD utilizes special purpose software developed to the specifications of the business (e.g., USPS) for the applications that it supports. This includes the identity verification procedure to guide the user through the proofing procedure.

FIG. 9 is an example screen display 900 when a customer is ready to sign into their account 910 or desires to create a new online application account 920 (e.g., using USPS). If the customer already has an account with the business, a username and password are required to log-in.

FIG. 10 is an example screen display when a customer verifies their account. For added security, some online applications require additional authentication beyond just a username and password. This is to make sure that no one else attempts to see, manage or tamper with the customer's shipments, for example. In the example shown, the customer is requested to enter their date of birth and their social security number to confirm the customer's identity. Answers to these questions are for verification only and neither the business (e.g., USPS) nor its partners store the user's answers. A business partner independently verifies the customer's information to uniquely resolve their identity. The independent service provider generates questions that only the particular customer should be able to answer. In some embodiments, the partner is a knowledge based authentication (KBA) supplier. After the requested information is entered, the customer can select the Get Verified button 1010, for example to start verification.

FIG. 11 is an example screen display 1100 of exemplary verification questions generated by the knowledge base authentication supplier, such as a financial service provider. The service provider generates the verification questions. The business (e.g., USPS) does not keep either the information used to create the questions or the customer's answers. In certain embodiments, the customer must answer every question to verify their identity and address. After the requested information is entered, the customer can select a Submit Answers button 1110, for example.

FIG. 12 is an example screen display 1200 illustrating a customer's preferences summary including an authentication level and a way to upgrade that level. The preferences include communications preferences and security preference information. The customer's current authentication level is listed along with an upgrade selection 1210 when the authentication level can be upgraded. If the authentication level can be upgraded, remote proofing such as shown in FIGS. 4a-4c or in-person proofing such as shown in FIGS. 5a-5f is performed. In certain embodiments, remote proofing using KBA is performed prior to receiving the option for IPP. However, in other embodiments the customer can bypass the remote identity verification and be immediately directed to in-person proofing. This can give customers at qualified addresses an option for selecting to perform in-person identity verification at a residential address, a postal location, or a business address.

Figure 13:
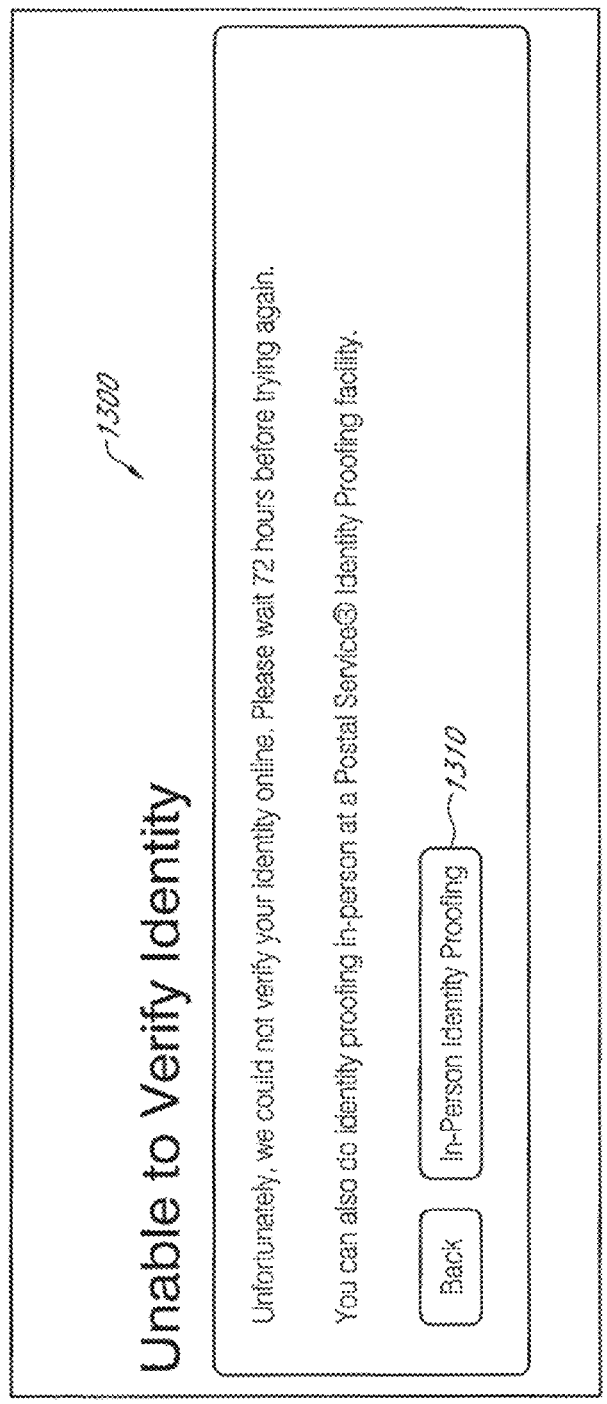
FIG. 13 is an example screen display illustrating a screen showing when the system could not verify the customer's identity online and options to wait a predetermined amount of time before remote proofing can be utilized or an option for in-person proofing.

FIG. 13 is an example screen display 1300 when the system could not verify the customer's identity online via remote proofing. The customer can wait a predetermined amount of time, such as 72 hours or another amount of time that is higher or lower than 72 hours, before remote proofing can be utilized again. Alternatively, the customer can select an in-person identity proofing button 1310, for example.

Figure 14:
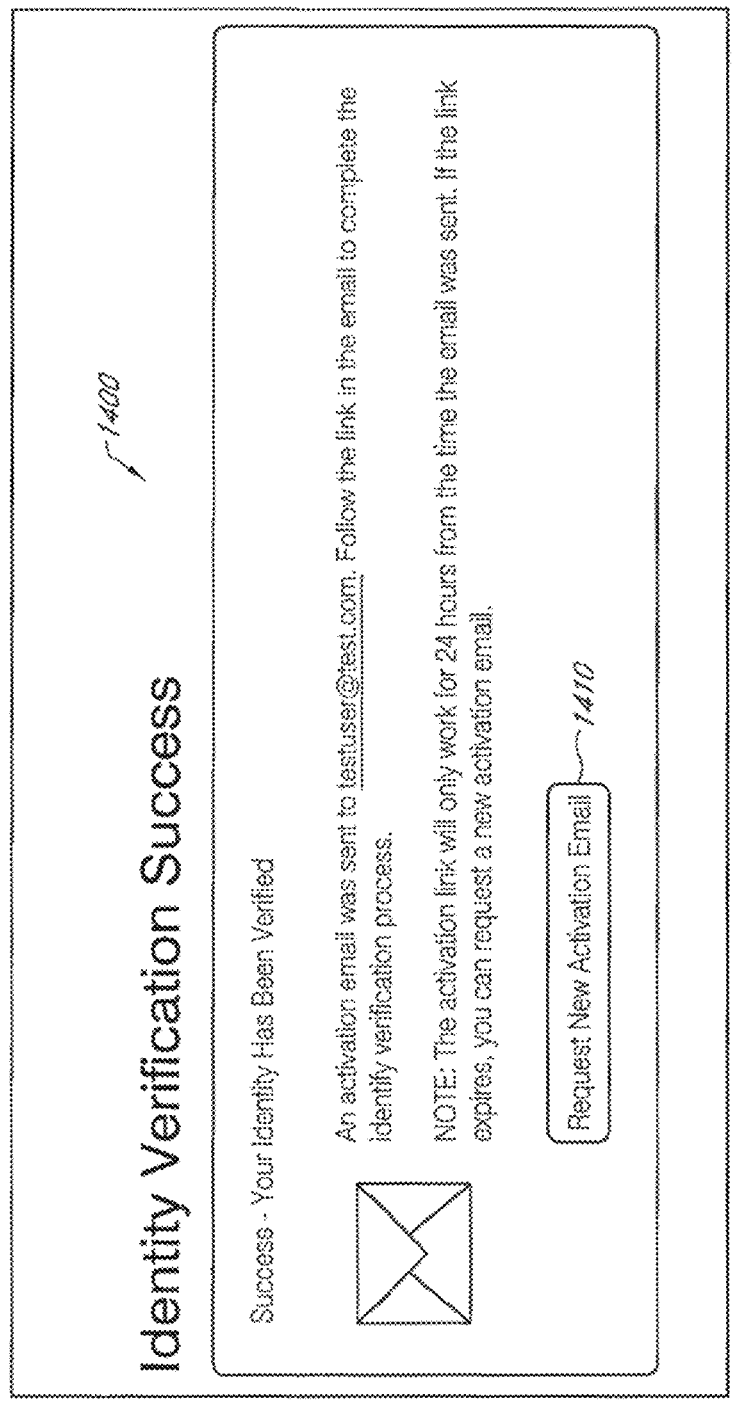
FIG. 14 is an example screen display illustrating a screen showing when the system can successfully verify the customer's identity.

FIG. 14 is an example screen display 1400 when the system has verified the customer's identity. An activation email having an activation link is sent to the email address of the customer. The customer needs to select the link in the email to complete the identity verification process. In certain embodiments the activation link is valid for a predetermined amount of time from the time the email is sent to the customer. If the link expires, the customer can request a new activation email by selecting a request button 1410 on the display, for example.

Figure 15:
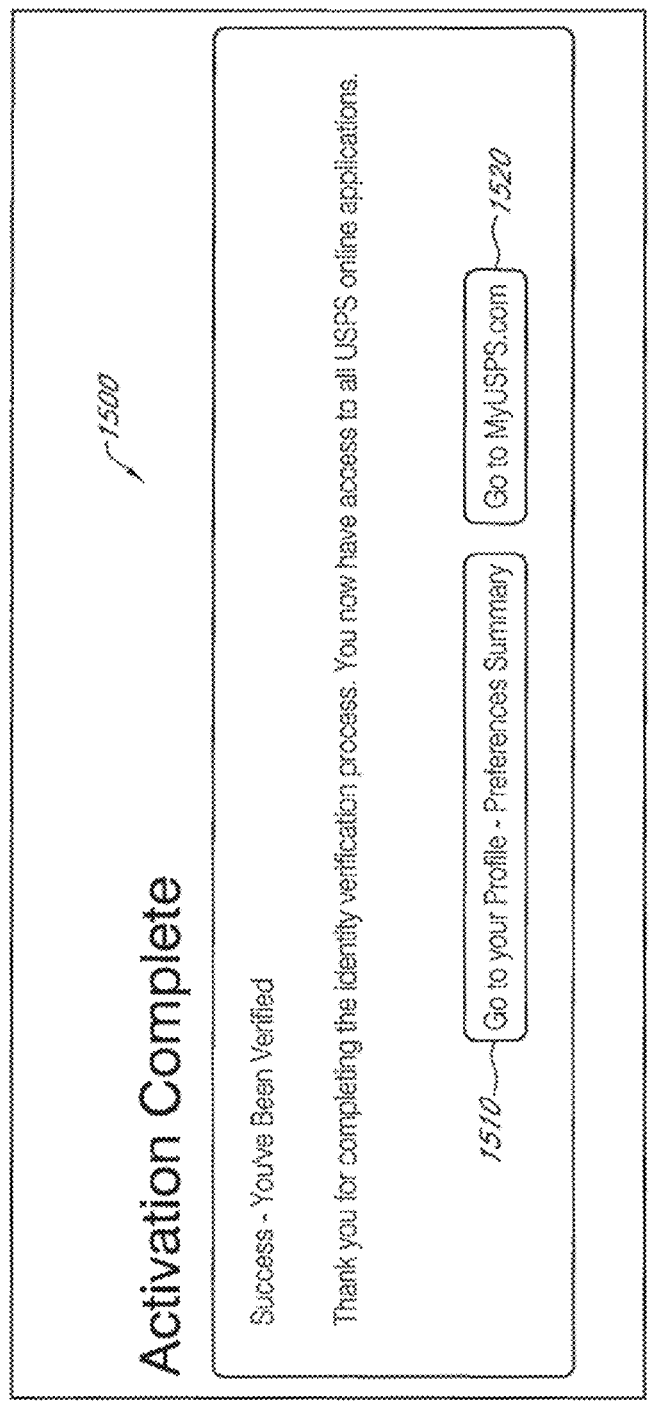
FIG. 15 is an example screen display illustrating a screen showing when activation of the customer's verified identity is complete.

FIG. 15 is an example screen display 1500 when activation of the customer's verified identity is complete. In this example, the customer has successfully completed the identity verification process and therefore has access to online applications requiring LOA-2. Options are provided to go to a profile-preferences summary 1510 or to go to the MyUSPS website 1520, for example.

Figure 16:
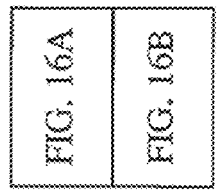
FIG. 16, comprising
Figure 16A:

FIGS. 16A-16B are an example screen display 1600 when in-person proofing has been selected to verify the customer's identity. The online application sends an email with instructions regarding in-person proofing to the email address previously provided by the customer. The in-person proofing request is active for a predetermined number of days, e.g., 30 days, from the time that the email is sent. If the request expires, the customer can either request a new in-person proofing email 1610 or retry to verify their identity online via remote proofing 1620. In certain embodiments, a list 1630 of nearby identity proofing facilities is provided to the customer.

Figure 17:
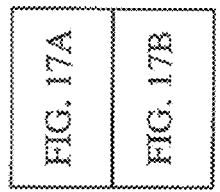
FIG. 17, comprising
Figure 17A:
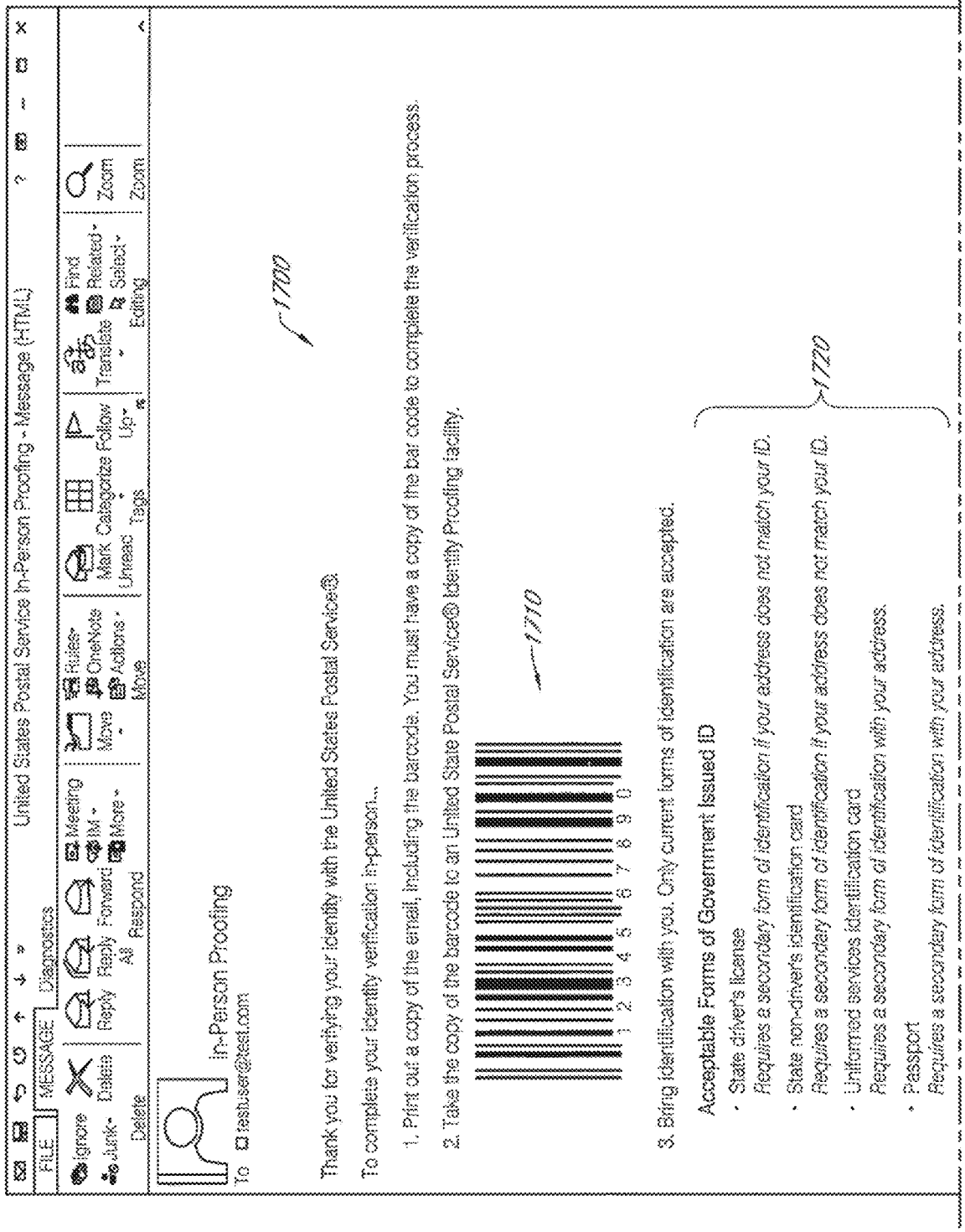

FIGS. 17A-17B are an example screen display 1700 of an email having a barcode 1710 sent to the customer when in-person proofing has been selected. In some embodiments, the barcode encodes certain information about the customer, and is used when the customer interfaces directly with an employee, clerk or carrier as described herein. The screen display can also provide a list of acceptable forms of identification documents 1720, such as government-issued documents, and acceptable secondary forms of identification 1730.

Figure 18:
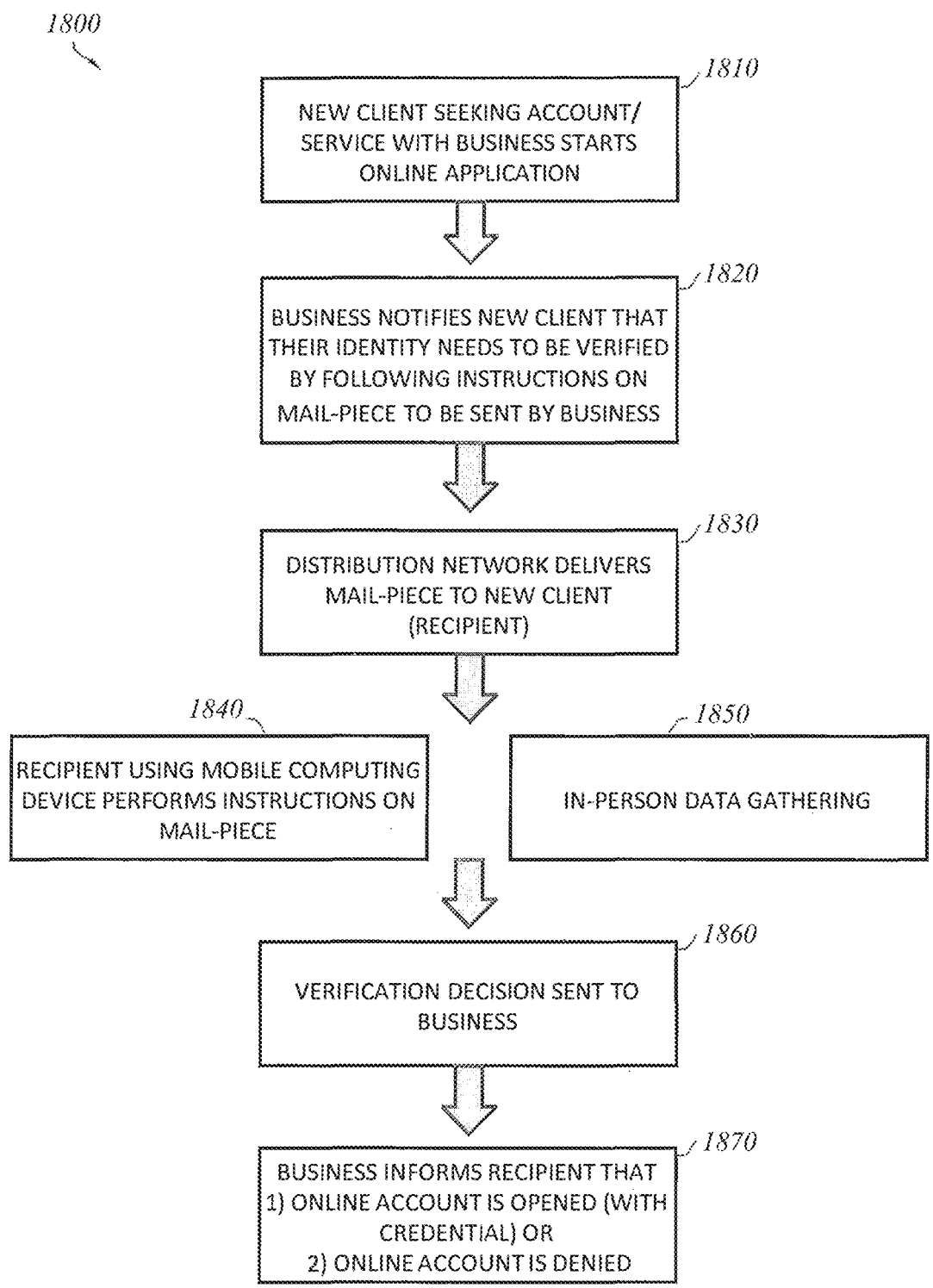
FIG. 18 is a flow diagram of another embodiment of an example high level process to verify customer identity.

FIG. 18 is a diagram of another embodiment of an example high level process 1800 to verify customer identity. An enhanced identity verification process, such as the exemplary USPS process, which can be performed via a website such as a USPS website, verifies the customer identity to a higher level of assurance (e.g., binding a digital identity to a physical address, phone and email). As an example, a bank may want to perform identity verification for high risk consumers.

Beginning at a step 1810, a new client seeking an account and/or a service with a business can begin an online application as a website for the business, for example. Proceeding to a step 1820, the business can notify the new client that their identity needs to be verified, which can be done by following instructions on a distribution item, such as a mail piece, to be sent by the business to the client. Advancing to a step 1830, a distribution network, such as the USPS, can deliver the mail piece to the client as the recipient of the mail piece. In some embodiments, the business can use an interface, such as a computer-based application to request a distribution item be generated by the distribution network. The business can select features, requirements, and the like for the distribution item to be sent to the customer.

Proceeding to step 1840 or step 1850, two ways of performing identity verification will be described. At step 1840, remote identity (ID) verification can be performed. Remote identity verification can be primarily conducted remotely by the client/recipient by providing information via an application as instructed. In certain embodiments, the application utilizes the acquired information to search external sources to verify identity. Remote identity verification will be further described herein below. Alternatively at step 1850, in-person ID verification can be performed. In-person verification can be performed at local business locations such as via USPS personnel at a local Post Office with a retail clerk or at a customer's home or business or other location, via a delivery resource, such as a mail carrier on their route by validating that identity information of a client matches stored information or that the physical face of the client matches a government-issued identification picture, for example, in a technology verification process. In-person verification will be further described herein below. Proceeding to step 1860, a verification decision about the client can be sent to the business. Moving to step 1870, the business can notify the client that either 1) the online account is opened with a credential, token or other method, or 2) the online account is denied. In certain embodiments, a credentialing process can be performed. After a successful identity verification, the carrier in an embodiment, via a handheld mobile device such as shown in FIG. 8, provides secure credentials that are associated in a database with the level of assurance validated by the carrier. A credential in the form of a user name and password combination or a token, as examples, can be created and assigned for the client. Credentialing may also involve tying the credential to a mobile device of the client and may include biometric login such as a fingerprint or voiceprint. After completion of the credentialing, process 1800 finishes. Once the user has an activated credential, the client user can log into the account using the credential to identify themselves.

Figure 19:
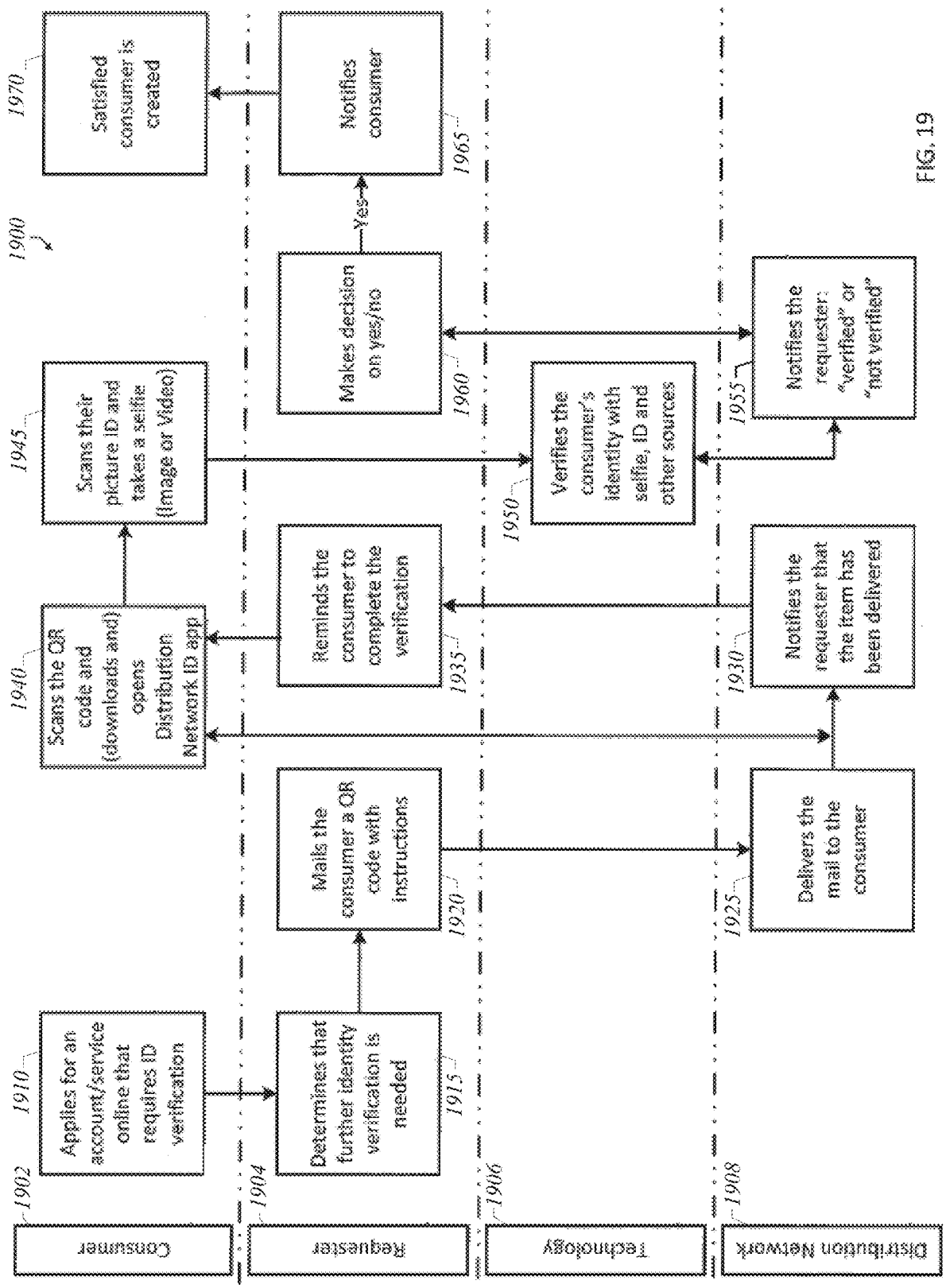
FIG. 19 is a block/flow diagram of an embodiment for an example relational configuration of elements of a system to conduct at least portions of the process illustrated in FIG. 18.

FIG. 19 is a block/flow diagram of an embodiment for an example relational configuration of elements of a system and process flow 1900 for conducting at least portions of a process such as illustrated in FIG. 18 for remote identity verification.

The system and process flow 1900 includes several entities performing various aspects of the process. These entities include a consumer/client 1902, a requester 1904 such as a business or organization, a technology entity 1906, and a distribution network 1908, such as the USPS. Each of the entities 1902, 1904, 1906 and 1908 are shown as corresponding to a horizontal portion or row of FIG. 19. In certain embodiments, the technology entity 1906 may be a third party knowledge based authentication (KBA) supplier as previously described. These entities may be associated with one or more processors such as shown by the system configuration 200 and/or system architecture 300 previously described.

Beginning at a step 1910, the consumer applies for an account or service online that requires identification verification. Moving to step 1915, the requester determines that further identity verification is needed. In certain embodiments, this may also include a type and/or location for conducting the verification, which can be based on the type of the account desired and other factors. Advancing to step 1920, the requester develops an indicia for placing on a mail piece along with instructions to the consumer as to what to do upon receiving delivery of the mail piece. In certain embodiments, the indicia is a QR code but other type of coding may be utilized. The QR code could be placed on a postcard, on the contents of an envelope such that the code is visible in the address window of the envelope, or on the envelope itself. The requester can set parameters such as time limit for initiating the verification process. In certain embodiments, the time limit can be encoded in the QR code. In many circumstances, the consumer is motivated to initiate and complete the verification process so as to continue interaction with the business or organization. The requester then mails such a mail piece for each consumer needing identity verification.

The business can provide information to be included in the indicia, such as the QR code, or can generate the indicia itself. The indicia can contain instructions, requirements, restrictions, and the like for a customer or client using the validation system. For example, the indicia can include requirements for documentation or other information that must be provided for the identify verification, including a government issued photo ID, evidence of an address, a name, a photograph (such as a selfie), a live image of the consumer or another object, biometric information, and/or any other desired evidence or information. In some embodiments, the indicia can encode links or instructions which cause a browser or computing application to access or navigate to a secure access portal, to a website, and the like.

The business can include unique instructions, code, or other indicators to the mobile application being used to verify identity, which identify a certain campaign, a certain transaction, a transaction type, a level of assurance requirement, and/or any other desired indicators. In an embodiment where the business or requester generates the indicia, the business or requester can send the indicia to the distribution network, together with any information required to understand the encoding of the indicia, as required for an application or system provided by the distribution network to utilize the indicia.

Continuing at step 1925, the distribution network delivers each of the mail pieces to the corresponding consumers, and then notifies the requester that the item has been delivered and optionally the date and/or time of delivery at step 1930. In certain embodiments, an intelligent mail barcode on the mail piece can be used to facilitate notifying the requester as delivery confirmation and may include when their mail pieces are delivered. After a predetermined time has elapsed without any action by the consumer, the requester can remind the consumer, such as via an email, a text, another mail piece and so forth, to complete the verification at step 1935.

In some embodiments, the delivery confirmation can cause the requester or business to activate a portal or provide an initial instruction to accept a scanned indicia to continue the identity proofing process. For example, a consumer can request an identity proofing from the requester, and the indicia is generated. The requester's systems can prevent or will not allow the consumer to proceed farther in the process until a delivery confirmation is received. This can ensure that the party wishing to proceed with the identity proofing lives or frequents the location to which the distribution delivered the distribution item. Once the delivery confirmation is received, the requester systems can allow the identity proofing process to proceed, and the indicia, such as a QR code, can be received as described herein.

At step 1940, the consumer scans the QR code on the received mail piece, which then either may cause a distribution network identification application to open or causes a download and opening of the distribution network identification application onto a computing device associated with the consumer. Once the distribution network identification application is launched, the consumer can tap an image of the mail piece or an identifier, or in other embodiments, scan the QR code. In certain embodiments, the encoded information from the QR code informs the application as to the information that is needed for the particular consumer or alternatively for all consumers to verify their identity.

As described above, when the QR code is scanned by the consumer's mobile computing device, the scan of the code can point the mobile computing device to another location, can trigger the download and/or opening of an application for the identity proofing. In some embodiments, the QR code is scanned from within an application, such as the USPS application. In this case, the QR code can navigate the application to a section for identity proofing. The contents of the QR code can cause the application to build a menu, list, or similar structure in the application including the verification items the requester requires, as described above. The requester can provide the distribution network or other entity which generates the QR code with particular requirements for the consumer to complete, provide, or accomplish. When the QR code is scanned, the requirements from the requester can be provided to the consumer. In some embodiments, the requirements can be encoded in the QR code, and in some embodiments, the requirements can be associated or accessed by a server in response to scanning the QR code.

Moving to step 1945, the consumer follows instructions provided on one or both of the mail piece or the application. In certain embodiments, this can include scanning a government-issued identification document or card having a picture of the consumer, and taking an image or video selfie, providing biometric information, live video, GPS coordinates, or any other information required by the requester. If the scanning of the government-issued identification document or card includes the address of the consumer, this information can be provided as ride-along content to the application and the process wouldn't need as much verification information. In certain embodiments, the application causes a triangulation of the consumer's location, such as via geo-fencing, as an additional data point. In certain situations, other data points are requested such as a scan of mail received on the prior day and biometrics including fingerprint or iris scanning.

Advancing to step 1950, the technology entity system 1906 can verify the consumer's identity using the data points acquired and optionally obtained from other sources. In one embodiment, a third party knowledge based authentication supplier may be utilized. In certain embodiments, a processor corresponding to the distribution network can perform the verification. In other embodiments, a third party such as described in step 535 (FIG. 5B) may be utilized for some or all of the verification. As described elsewhere herein, the third party supplier can be a credit agency, a cellular service provider, a cable provider, a utility, a government records database, and the like.

In some embodiments, image analysis is performed on the selfie image to determine among other steps, whether is a "live" image versus an image of a photo. In certain embodiments, a video selfie may be required to combat such a problem. The application or a server with which the application is in communication, can analyze the image to determine whether there are changes from image to image, or from one frame to the next, such as blinking, breathing, twitching, etc. The application or server can also determine a time stamp from a video or series of images to determine that the images were taken at a time after the delivery of the distribution item and/or the scanning of the indicia. This will prevent using a photograph or similar item to trick the identity proofing process. Another analysis may be performed on the government-issued identification document or card, such as checking micro-security features on a driver's license, for example. In certain embodiments, a transaction identification, a document hash and/or a data hash are generated as part of the verification step.

The verified or not verified decision can be made by the requester or by the distribution network by analyzing the required information, provided via the application, via the mobile computing device, and/or from third party verification sources, the information including GPS information, images, metadata in images, mobile computing device identifiers, other evidence provided, etc. The provided information is analyzed and compared to known information or to known standards. Continuing at step 1955, the distribution network obtains the verification results and notifies the requester, such as via electronic communication, of the results.

Proceeding to step 1960, the requester makes a decision as to whether or not to open the account or perform a service for the consumer based on the results received from the distribution network. In certain embodiments, an URL may be provided for pass or fail actions to take. The requester then notifies the consumer at step 1965 of the decision, and if the decision is to open the account or perform the service, a credential in the form of a user name and password combination or a token, as examples, can be created and assigned for the client at step 1970. Credentialing may also involve tying the credential or token to a mobile device of the client. In addition or in place of the credential or token step, a URL link can be activated for further processing, such as, for example, enabling the consumer to log in to the business website.

Figure 20:
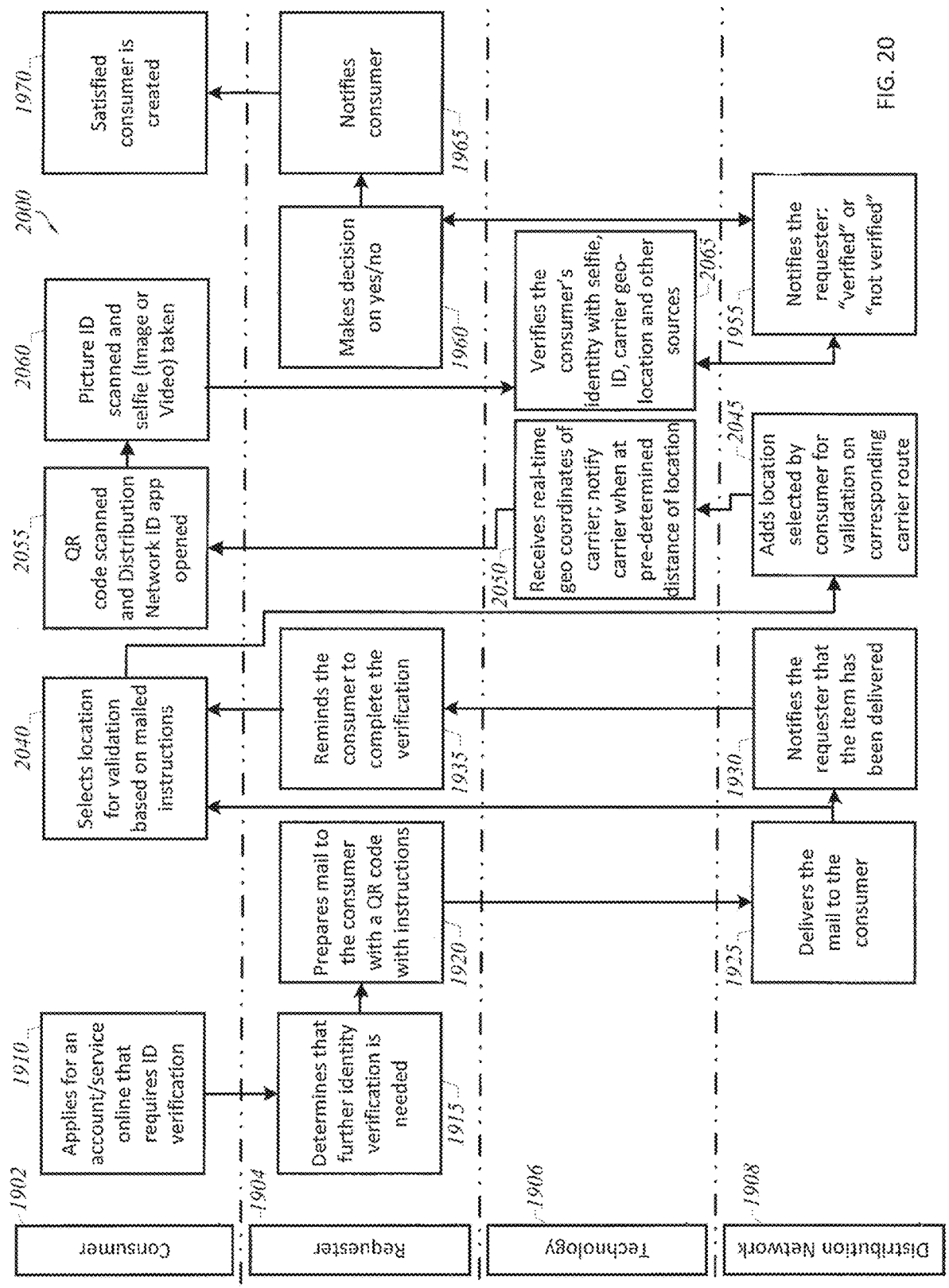
FIG. 20 is a block/flow diagram of another embodiment for an example relational configuration of elements of a system to conduct at least portions of the process illustrated in FIG. 18.

FIG. 20 is a block/flow diagram of another embodiment for an example relational configuration of elements of a system and process flow 2000 for conducting at least portions of a process such as illustrated in FIG. 18 for in-person verification.

The system and process flow 2000 includes several entities performing various aspects of the process. These entities include a consumer/client 1902, a requester 1904 such as a business or organization, a technology entity 1906, and a distribution network 1908, such as the USPS. Each of the entities 1902, 1904, 1906 and 1908 are shown as corresponding to a horizontal portion of FIG. 20. These entities may be associated with one or more processors such as shown by the system configuration 200 and/or system architecture 300 previously described.

Steps 1910 to 1935 are similar to the steps 1910 to 1935 of FIG. 19 and thus the description for these steps is not repeated. After delivery of the mail piece to the consumer by the distribution network at step 1925 or after the reminder to the consumer to complete the verification at step 1935, process 2000 continues at a step 2040. The consumer follows the instructions on the mail piece, which in certain circumstances may include an-person verification, such as when the business deems it necessary. The business may require in-person verification when the risk is high or if more than one level of assurance change is needed, for example. In certain embodiments, in-person verification may include a choice of locations such as at a retail location of the distribution network or at the location of the consumer at a residence address or a business address.

When the consumer selects in-person verification at a specific location, such as the consumer's residence address or a business address, this information is provided to the distribution network processors at step 2045. A verification event is added to the carrier route for the corresponding carrier who is regularly assigned to a route including the selected location. The verification event notifies the carrier of the verification event and provides further instructions and identifies the specific location. In some embodiments, an application is enabled or turned on in the carrier's mobile computing device to enable or allow for the in person verification event. In some embodiments, the carrier's mobile computing device cannot access the in-person proofing application unless or until the QR code on a mailpiece has been scanned, as described elsewhere herein, and the consumer has selected the in-person verification location. The server sends this information to the carrier's mobile computing device. The verification event information includes the selected residence address or business address. The carrier utilizes a mobile specialized computing device having a geo-location circuit to monitor real-time location information on the carrier's assigned route. At step 2050 the technology system receives the real-time geo-coordinates of the carrier and notifies the carrier when the mobile device is within a predetermined distance of the consumer's residence address or business address.

In some embodiments, the identity proofing application is not activated, or is not useable by the carrier, until the carrier is within a geofence surrounding the specified location, such as the residence or business address, selected by the consumer. In some embodiments, the system checks to confirm the GPS breadcrumb data from the carrier mobile device indicates that the carrier is traversing the normal route, at an expected time prior to allowing access to the identity verification application on the mobile computing device.

Advancing to step 2055, the carrier requests the consumer to present the received mail piece with the QR code. If the carrier does not already have the distribution network identification application open, the carrier opens the application and scans the QR code. The carrier then follows the instructions presented by the application to obtain information from the consumer. Alternatively, the carrier performs the instructions provided in or with the mail piece. In certain embodiments, the government-issued identification of the consumer is scanned and a selfie image or video of the consumer is taken via the application running on the carrier mobile device, along with the geo-coordinates of the carrier mobile device at step 2060. Other information, such as described in conjunction with process 1900 above, may be obtained and provided via the application.

Continuing at step 2065, the technology system processes the obtained information along with optionally obtained information from other sources to verify the consumer's identity. This step is similar in processing to step 1950 of FIG. 19, and may additionally include evaluating the information of the carrier's geo-coordinates of the carrier mobile device at the consumer's location and confirmation by the carrier that the selfie is a live selfie. Based on the verification results of step 2065, the process steps 1955 to 1970 of FIG. 20 are performed as previously described in conjunction with FIG. 19.

Figure 21:
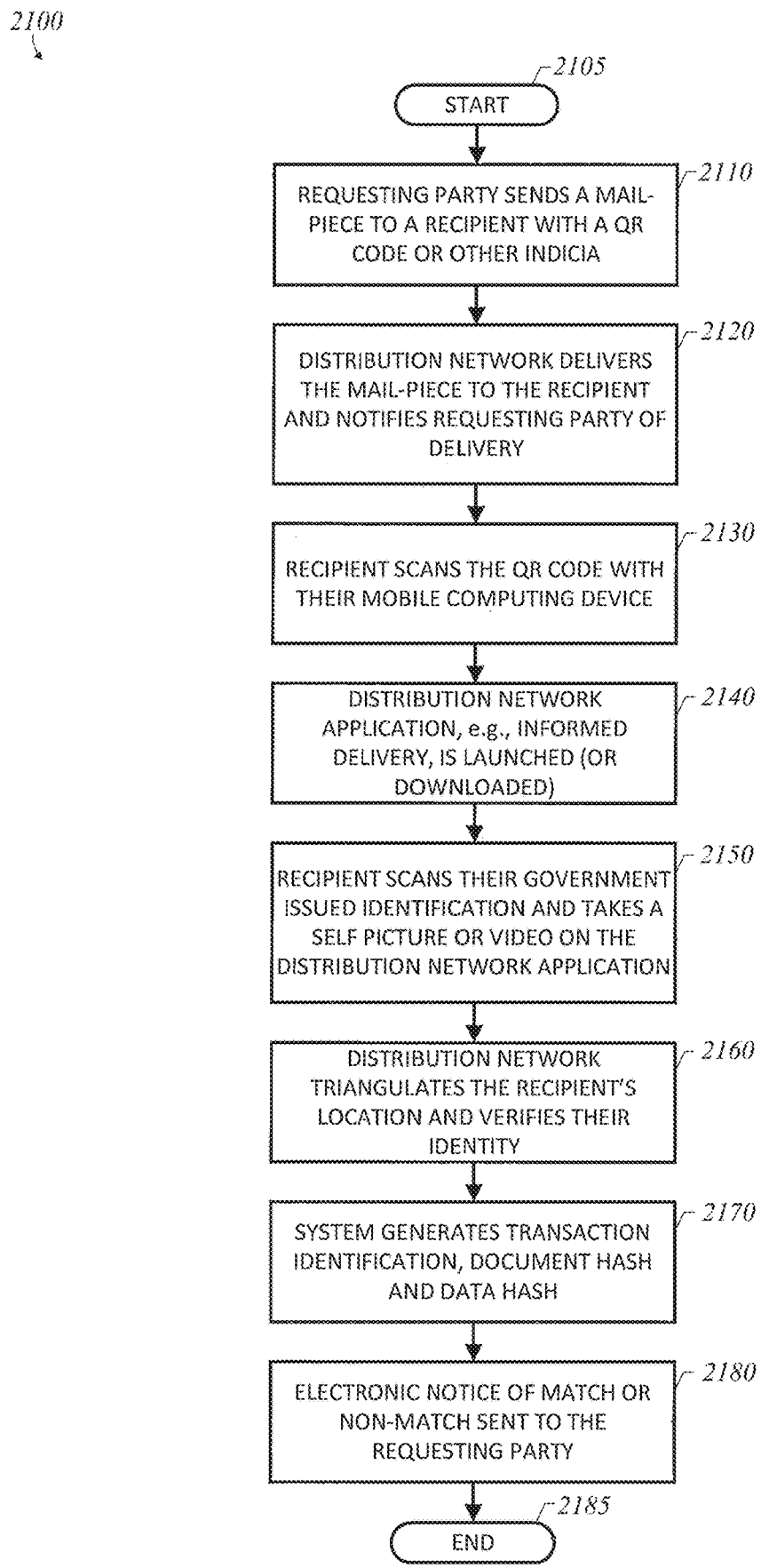
FIG. 21 is a flow diagram of an example flow for an online remote identity verification process such as identified in FIGS. 18 and 19.

FIG. 21 is a flow diagram of an example flow for an online remote identity verification process 2100 such as identified in FIGS. 18 and 19. The process flow 2100 includes several entities performing various aspects of the process. These entities can include a consumer/client, a requester such as a business or organization, a technology system and a distribution network, such as the USPS. These entities may be associated with one or more processors such as shown by the system configuration 200 and/or system architecture 300 previously described.

Beginning at a start step 2105, process 2100 advances to step 2110 where the requesting party (e.g., business or organization) sends a mail-piece with a QR code or other indicia to a recipient or consumer desiring to do business, such as opening an account, with the business or organization. Advancing to step 2120, the distribution network delivers the mail piece to the recipient and notifies the requesting party of the delivery, which can be done by use of an intelligent mail barcode, in one embodiment. Proceeding to step 2130, the recipient, who desires to conduct business with the requesting party and is thus motivated, scans the QR code or other indicia.

Continuing at step 2140, a distribution network application, such as the USPS Informed Delivery® application or similar application and functionality, is launched on the recipient's computing device, or downloaded to the recipient's computing device if not already present on the device. In some embodiments, the Informed Delivery® application is provided by the distribution network and is a system or portal where a consumer can see what distribution items, such as mailpieces, are intended for delivery to the consumer for a given day, two days, week, etc. Such as system can be referred to as an informed Delivery® system. In such as system, a consumer may need to sign up and be verified to use the system. A consumer can see images of mailpieces which are to be delivered to the consumer. Where a consumer is a customer of Informed Delivery®, the consumer can simply tap, select, click on, etc., an icon, such as indicia or QR code, in the identity verification mailpiece from the requester, or simply tap anywhere on the image of the mailpiece. Selecting the icon or the image of the mailpiece can initiate the identity verification processes described herein. In some embodiments, the distribution network may already have a level of assurance obtained when a consumer registered for the Informed Delivery® service. This level of assurance, or confidence in the identity of the user can be used in the identity verification process. If the requester requires the same or a lower level of assurance, the distribution network can provide a verified identity message to the requester when the image of the mailpiece is selected. In some embodiments, if the level of assurance required by the requester is higher than that for the Informed Delivery® service, then tapping on the image of the mailpiece can trigger the steps for identity verification provided herein.

If a consumer is not a user of the Informed Delivery® service, scanning the indicia on a mailpiece delivered to the consumer can trigger the Informed Delivery® service registration process. The process for registration for this service can include the steps described herein.

Moving to step 2150, the recipient follows instructions provided on one or both of the mail piece or using the application. In certain embodiments, this can include scanning a government-issued identification document or card having a picture of the consumer, and taking an image or video selfie, as described elsewhere herein. If the scanning of the government-issued identification document or card includes the address of the recipient, this information can be provided as ride-along content to the application. Proceeding to step 2160, the application causes a triangulation of the recipient's location, such as via geo-fencing, as an additional data point. In certain embodiments, other data points may be requested such as a scan of mail received on the prior day and biometrics including fingerprint or iris scanning. The technology system, which may utilize portions of the distribution network, verifies the recipient's identity as previously described above.

Advancing to step 2170, the technology system, which can be a part of the distribution network, a third party computer system, etc., generates a transaction identification, a document hash and a data hash based on the obtained information as previously described above. Based on this information, the distribution network can provide an electronic notice of a match or non-match of the recipient's identity to the requesting party at step 2180 and the process 2100 completes at end step 2185.

Figure 22:
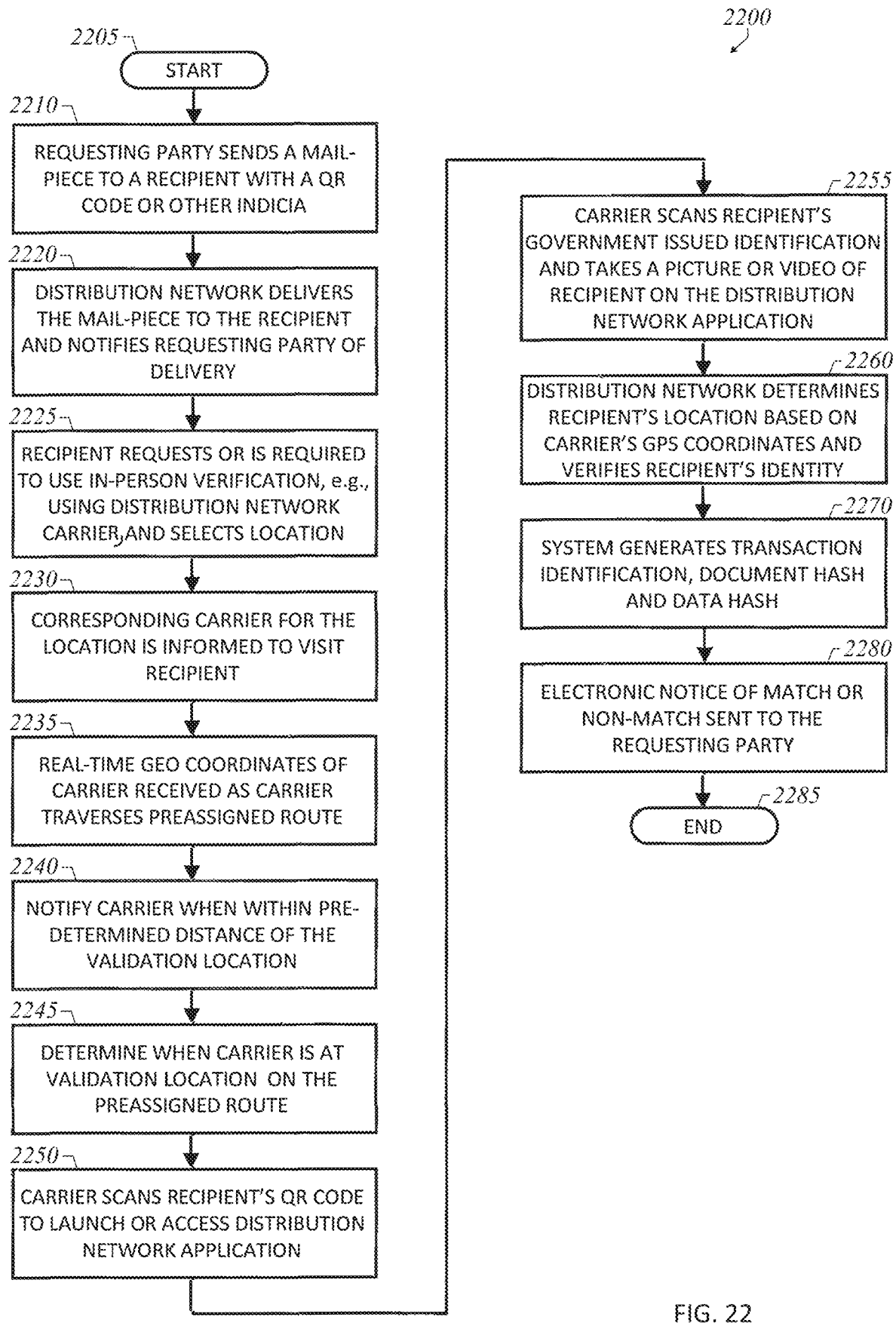
FIG. 22 is a flow diagram of an example flow for an in-person remote identity verification process such as identified in FIGS. 18 and 20.

FIG. 22 is a flow diagram of an example flow for an in-person identity verification process 2200 such as identified in FIGS. 18 and 20. The process flow 2200 includes several entities performing various aspects of the process. These entities can include a consumer/client, a requester such as a business or organization, a technology system and a distribution network such as the USPS. These entities may be associated with one or more processors such as shown by the system configuration 200 and/or system architecture 300 previously described.

Beginning at a start step 2205, process 2200 advances to step 2210 where the requesting party (e.g., business or organization) sends a mail-piece with a QR code or other indicia to a recipient or consumer desiring to do business, such as opening an account, with the business or organization. Advancing to step 2220, the distribution network delivers the mail piece to the recipient and notifies the requesting party of the delivery, which can be done by use of an intelligent mail barcode, in one embodiment.

Continuing at step 2225, either the recipient requests in-person verification (such as due to an inability to run the distribution network application) or is required to use in-person verification by the requesting party, for example. If the recipient is able to run the application, a location for the verification event can be selected by scanning the QR code and launching the application. If the recipient is unable to run the application, alternative ways of selecting the location for the verification can be used, such as sending an email to a provided address, mailing a return postcard, and so forth. In certain embodiments, one or more options may be presented to the recipient such as utilizing a retail location for the distribution network and using a distribution network carrier on a predetermined route that includes one of the recipient's residence address or business address. If the option for utilizing the distribution network carrier is selected, a corresponding carrier for the location is informed to visit the recipient at step 2230.

Proceeding to step 2235, real-time geographic coordinates of the carrier's mobile computing device are received as the carrier traverses the preassigned carrier route. The mobile computing device notifies the carrier at step 2240 when the mobile computing device is within a predetermined distance of the validation event location for the recipient. A determination is made of the time and location when the carrier arrives at the validation location on the preassigned route at step 2245. Advancing to step 2250, the carrier scans the recipient's QR code on the received mail piece to either launch the distribution network application or to access the application if the application is already launched.

Moving to step 2255, the carrier follows instructions provided on one or both of the mail piece or using the application. In certain embodiments, this can include scanning a government-issued identification document or card having a picture of the consumer, and taking a picture or video of the recipient. If the scanning of the government-issued identification document or card includes the address of the recipient, this information can be provided as ride-along content to the application. Proceeding to step 2260, the application uses the geographic coordinates of the carrier's mobile computing device to determine the consumer's location. In certain embodiments, other data points may be requested such as a scan of mail received on the prior day and biometrics including fingerprint or iris scanning. The technology system, which may utilize portions of the distribution network, verifies the recipient's identity as previously described above.

Advancing to step 2270, the technology system generates a transaction identification, a document hash and a data hash based on the obtained information as previously described above. Based on this information, the distribution network can provide an electronic notice of a match or non-match of the recipient's identity to the requesting party at step 2280 and the process 2200 completes at end step 2285.

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the above detailed description has shown, described, and pointed out novel features of the invention as applied to various embodiments, it will be understood that various omissions, substitutions, and changes in the form and details of the device or process illustrated may be made by those skilled in the art without departing from the intent of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of generating authentication credentials, the method comprising:
   receiving from a first user, using a first user computing system and a network, input identifying a customer identifier for an online account to be opened with a business or organization and a residential or business physical address;
   receiving a coded indicia, the coded indicia encoding identity verification instructions for verifying the identity of the customer not having an open online account;
   sending a physical distribution item via a distribution network to the residential or business physical address of the first user, the physical distribution item having the coded indicia thereon;
   activating an identity verification application in response to scanning a coded indicia on the physical distribution item;
   electronically receiving data indicative of an identity of the first user based on instructions provided in the identity verification application;
   verifying the identity of the first user based on the received data;
   generating a recommendation whether to approve the online account for the business or organization;
   electronically sending, via the network, an acceptance or a denial of opening the online account; and
   creating an electronic credential or token for the first user based on the acceptance of the online account.

2. The method of claim 1, wherein the data is based in part on a scan of a government-issued identification card or document and a picture or video of the face of the first user.

3. The method of claim 1, wherein scanning the coded indicia on the distribution item is performed by a mobile computer system, having a real-time geographic location circuit, operated by a mobile second user.

4. The method of claim 3, wherein the mobile second user is a person traversing a preassigned route and is employed by or an agent of an entity.

5. The method of claim 4, wherein the preassigned route includes the residential or business physical address corresponding to the first user.

6. The method of claim 1, wherein the coded indicia encodes instructions to the identity verification application regarding the data indicative of the identity of the first user.

7. The method of claim 5, wherein the verifying includes electronically determining a location of the first user computing system and utilizing the determined location to confirm that it matches the first user's residential or business physical address.

8. A system for generating authentication credentials, the system comprising:
   a networked computing device including one or more processors operably configured to access one or more storages,
   wherein the one or more processors is operably configured to:
   receive from a first user, using a first user computing system, input identifying a customer identifier for an online account to be opened with a business or organization, and a residential or business physical address;
   receive a coded indicia encoding identity verification instructions for verifying the identity of the customer not having an open online account;
   notify the business or organization that a physical distribution item having the coded indicia is delivered to the residential or business physical address of the first user via a distribution network;

activate an identity verification application in response to scanning the coded indicia on the distribution item;

electronically receive a data indicative of an identity of the first user based on instructions provided on the distribution item or in the online application;

verify the identity of the first user based on the received data indicative of an identity of the first user;

generate a recommendation whether to approve the online account for the business or organization;

electronically send an acceptance or a denial of opening the online account; and create an electronic credential or token for the first user based on the acceptance of the online account.

9. The system of claim 8, wherein the data is based in part on a scan of a government-issued identification card or document and a picture or video of the face of the first user.

10. The system of claim 8, additionally comprising a mobile computer system having a real-time geographic location circuit operated by a mobile second user, wherein scanning the coded indicia on the distribution item is performed by the mobile computer system.

11. The system of claim 10, wherein the mobile second user is a person traversing a preassigned route and is employed by or an agent of an entity.

12. The system of claim 11, wherein the preassigned route includes the residential or business physical address corresponding to the first user.

13. The system of claim 8, wherein the coded indicia encodes instructions to the identity verification application regarding the plurality of data indicative of the identity of the first user.

14. The system of claim 12, wherein the verifying includes electronically determining a location of the first user computing system and utilizing the determined location to confirm that it matches the first user's residential or business physical address.

15. The method of claim 3, wherein the data is based in part on a scan of a government-issued identification card or document and a picture or video of the face of the first user by the mobile computer system operated by the mobile second user employed by or an agent of the distribution network.

16. The method of claim 3, wherein receiving from the user further includes receiving a selection indicating a first location of a validation event, and the method further includes providing a notification to the mobile second user when the mobile computer system is within a predetermined distance from the first location of the validation event based on received real-time geographic coordinates of the mobile second user.

17. The method of claim 16, wherein activating the identity verification application in response to scanning the coded indicia on the physical distribution item is performed based on the scanning at the validation event, and wherein the verifying the identity is further based on geographic location information of the mobile second user at the validation event.

18. The system of claim 10, wherein the data is based in part on a scan of a government-issued identification card or document and a picture or video of the face of the first user by the mobile computer system operated by the mobile second user employed by or an agent of the distribution network.

19. The method of claim 1, wherein the identity verification instructions for verifying the identity of the customer are performed by the first user.

20. The method of claim 1, wherein the identity verification instructions for verifying the identity of the customer are performed by a mobile second user employed by or an agent of the distribution network.

21. The method of claim 4, wherein the mobile second user is a person traversing a preassigned route and is employed by or an agent of the distribution network.

* * * * *

UNITED STATES PATENT AND TRADEMARK OFFICE
CERTIFICATE OF CORRECTION

PATENT NO. : 11,790,471 B2
APPLICATION NO. : 17/011859
DATED : October 17, 2023
INVENTOR(S) : Punnoose et al.

It is certified that error appears in the above-identified patent and that said Letters Patent is hereby corrected as shown below:

In the Claims

In Column 31, Claim 13, Line 33, delete "plurality of data" and insert --data--.

Signed and Sealed this
Sixth Day of February, 2024

Katherine Kelly Vidal
*Director of the United States Patent and Trademark Office*